United States Patent [19]

Kawaguchi et al.

[11] Patent Number: 5,732,164
[45] Date of Patent: Mar. 24, 1998

[54] PARALLEL VIDEO PROCESSOR APPARATUS

[75] Inventors: Naohisa Kawaguchi; Yasuhiro Iijima; Kazumi Saito, all of Kawasaki, Japan

[73] Assignee: Fujitsu Limited, Kawasaki, Japan

[21] Appl. No.: 341,166

[22] Filed: Nov. 16, 1994

Related U.S. Application Data

[63] Continuation of Ser. No. 889,119, May 26, 1992, abandoned.

[30] Foreign Application Priority Data

May 23, 1991 [JP] Japan ................................. 3-118854

[51] Int. Cl.⁶ .................... G06K 3/36; H04N 9/64; G05B 19/18
[52] U.S. Cl. .................... 382/304; 348/720; 348/721; 364/136
[58] Field of Search ................................. 382/304, 307, 382/254; 348/720, 721; 358/160, 166; 364/136

[56] References Cited

U.S. PATENT DOCUMENTS

| | | | |
|---|---|---|---|
| 4,149,178 | 4/1979 | Estes | 358/139 |
| 4,363,104 | 12/1982 | Nussmeier | 364/515 |
| 4,539,593 | 9/1985 | Jutier et al. | 358/160 |
| 4,783,832 | 11/1988 | Kaneko | 382/41 |
| 4,939,575 | 7/1990 | Childers | 382/41 |
| 4,942,593 | 7/1990 | Nishitani et al. | 358/160 |
| 5,058,158 | 10/1991 | Matias et al. | 382/41 |
| 5,129,092 | 7/1992 | Wilson | 382/304 |
| 5,157,742 | 10/1992 | Niihara | 382/41 |
| 5,264,931 | 11/1993 | Yamada | 348/720 |

FOREIGN PATENT DOCUMENTS

| | | | |
|---|---|---|---|
| A-0 201 261 | 11/1986 | European Pat. Off. | G06F 15/66 |
| 0 201 261 | 12/1986 | European Pat. Off. | G06F 15/66 |
| 87/04826 | 8/1989 | European Pat. Off. | G06F 13/18 |
| A-61-296 462 | 12/1986 | Japan | G06F 15/66 |
| A-63-040 971 | 2/1988 | Japan | G06F 15/66 |
| WO-A 85 05707 | 12/1985 | WIPO | G06F 11/08 |
| WO-A-87 04826 | 8/1987 | WIPO | G06F 13/18 |

*Primary Examiner*—Andrew Johns
*Assistant Examiner*—Monica S. Davis
*Attorney, Agent, or Firm*—Staas & Halsey

[57] ABSTRACT

Processing a moving image such that, after an input video signal is supplied to an image inputter, the image inputter time-divisionally converts the input video signal to a digital signal and outputs a control signal such as a vertical synchronous signal. A multiplexer reads image data converted by the image inputter into the digital signal and stores them into a plurality of temporary storers unique for frames according to the control signal from the image inputter. The plurality of temporary storers are respectively connected with a plurality of processor elements which process the memory contents of the plurality of temporary storers and re-store the processing results back in the plurality of temporary storers. A multiplexer sequentially retrieves the memory contents from the plurality of temporary storers, and has an image outputter for converting a digital signal to a video signal output them.

15 Claims, 33 Drawing Sheets

FIG. 4

```
                  0                   1                   2
TIME        0 1 2 3 4 5 6 7 8 9 0 1 2 3 4 5 6 7 8 9 0

PICTURE DISPLAY     1 2 3 4 5 6 1 2 3 4 5 6 1 2 3 4 5 6
UNIT NUMBER
```

UNIT 1 |—PROCESSING—|       |—PROCESSING—|----
                  |—PROCESSING—|

UNIT 2   |—PROCESSING—|       |—PROCESSING—|----
                    |—PROCESSING—|

UNIT 3     |—PROCESSING—|       |—PROCESSING—|----
                      |—PROCESSING—|

UNIT 4       |—PROCESSING—|       |—PROCESSING—|----
                        |—PROCESSING—|

UNIT 5         |—PROCESSING—|       |—PROCESSING—|----
                          |—PROCESSING—|

UNIT 6           |—PROCESSING—|       |—PROCESSING—|----
                            |—PROCESSING—|

— : DISPLAYING PERIOD
— : PROCESSING PERIOD

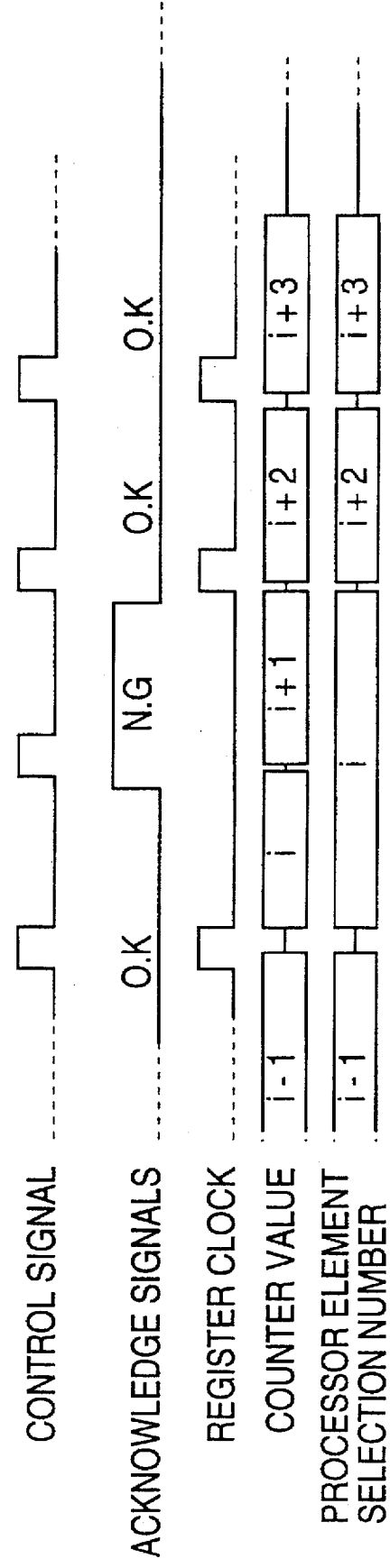

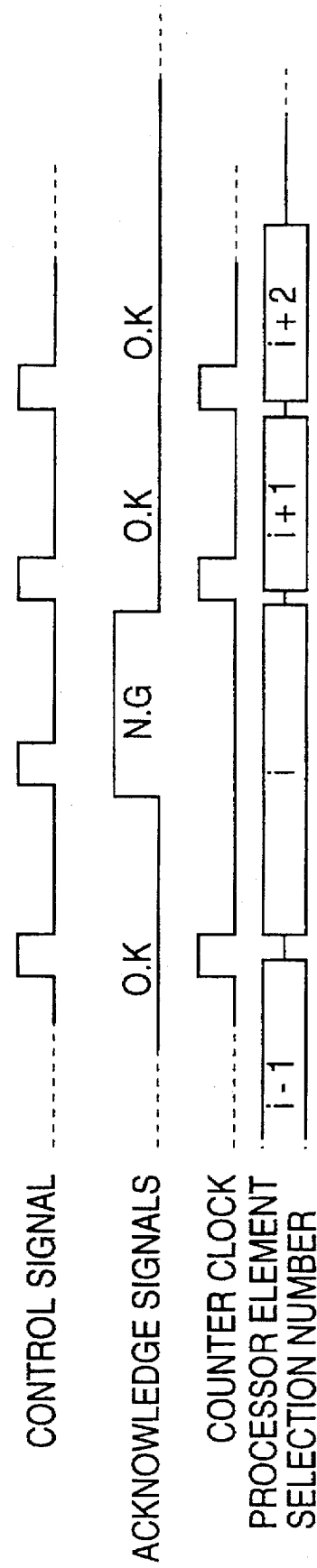

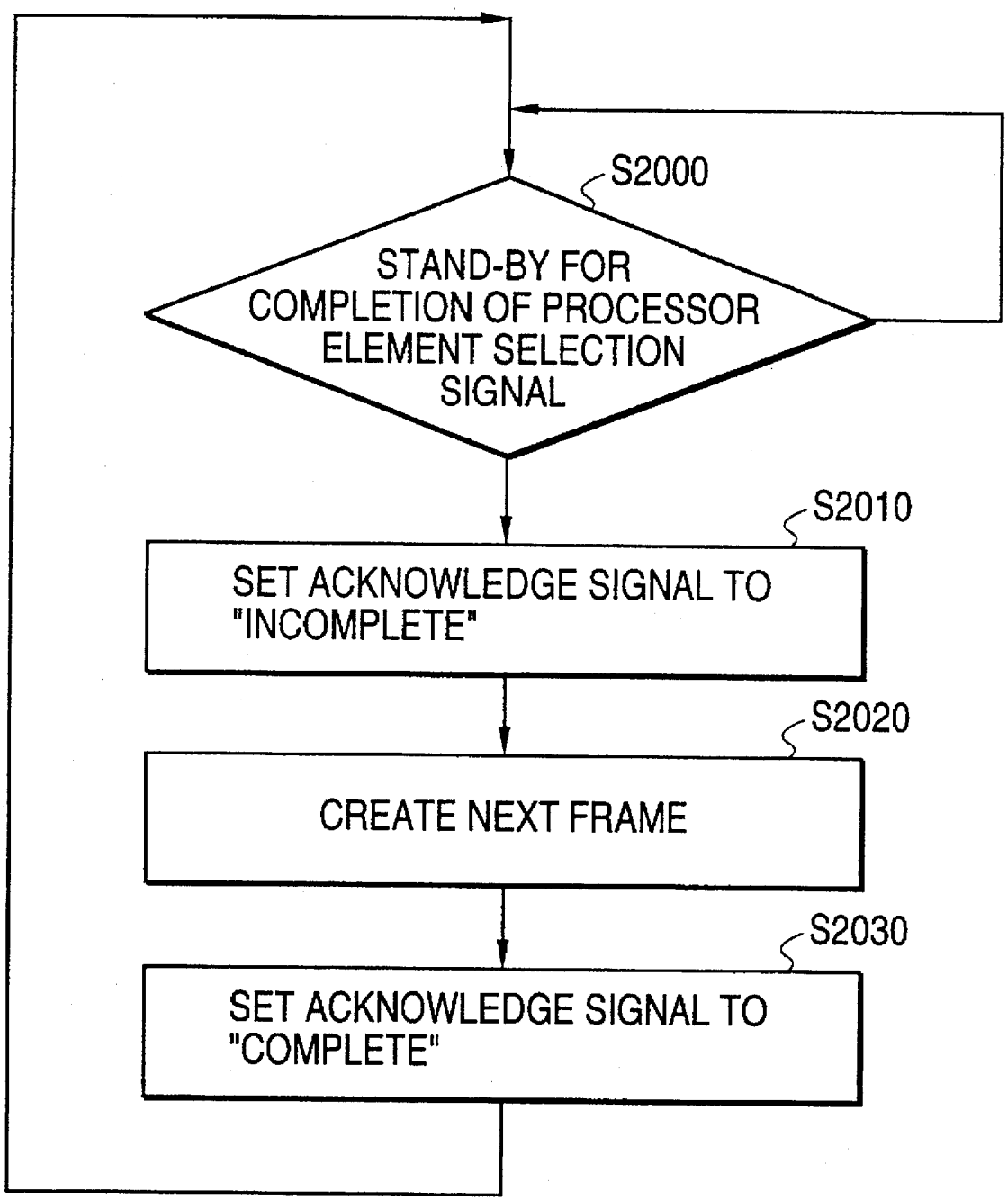

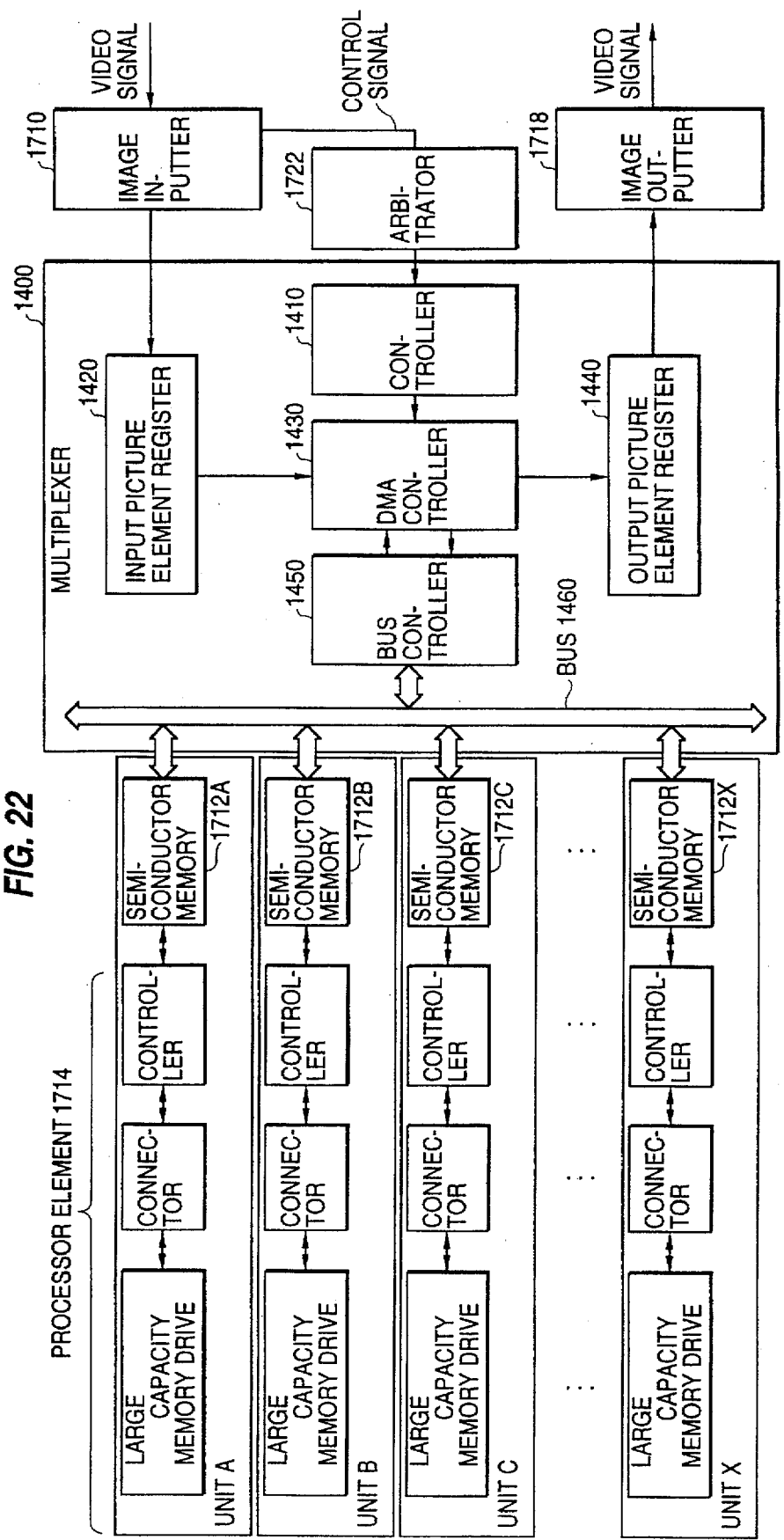

PARALLEL VIDEO PROCESSOR APPARATUS

This application is a continuation of application Ser. No. 07/889,119, filed May 26, 1992, now abandoned.

BACKGROUND OF THE INVENTION

1. Field of the Invention

This invention relates to a moving image processor processing an analog image input at a video rate, and more particularly, to a versatile moving image processor capable of flexibly changing the processing content and the hardware configuration at a reasonable cost.

2. Description of the Related Art

With advances in microprocessors featuring higher speeds and lower costs, an easier realization of computer graphic animation of a moving image is sought after.

FIG. 1 ("PRIOR ART") is a block diagram of an exemplary conventional moving image processor.

The moving image processor shown in FIG. 1 comprises an NTSC/RGB converter 101 for converting an NTSC signal into an RGB signal, an A/D converter 102, a noise eliminator 103, a differentiator 104, a feature extractor 105, a recognizer/matcher 106, a processing result drawer 107, a temporary storer 108, a D/A converter 109, and an RGB/NTSC converter for converting an RGB signal into an NTSC signal.

The moving image processor recognizes and matches a moving image by extracting its features, as well as draws the processing result.

The moving image processor has its processor elements (e.g. the noise eliminator 103, the differentiator 104, the feature extractor 105, . . . ) connected in pipelines, thereby having a moving image inputted to the NTSC/RGB converter 101 to be pipelined to be outputted from the RGB/NTSC converter 110.

FIG. 2 ("PRIOR ART") is a block diagram of another exemplary conventional moving image processor.

The moving image processor shown in FIG. 2 comprises a graphic subsystem 210, a plurality of CPU boards 220 (220-1, . . . , 220-n) and a main memory 230, each connected with an image data bus 240 and a common bus 250.

Each of the plurality of CPU boards 220 comprises a corresponding one of CPUs 221, FPUs 222, primary data cache memories 223, write buffers 224, secondary data cache memories 225, command cache memories 226 and read buffers 227, which expedite the processes on each of the CPU boards 220.

Because the CPU boards 220 exist in plurality, their operations can be paralleled whose results obtained as moving images (video signals) are outputted from the graphic subsystems 210.

When a plurality of processor elements are connected in pipelines as shown in FIG. 1, there is a disadvantage that the realizable function is limited due to a limit on the pipeline processes. In addition, there is a problem that the processing content or the hardware configuration cannot be flexibly changed.

When the plurality of CPU boards 220 form a moving image processor, because the CPU boards 220 operate in parallel interactively, it becomes necessary to expedite the entirety for sufficiently taking advantage of the device performance, which makes hardware rather expensive.

SUMMARY OF THE INVENTION

This invention was conceived based on the above background aims at providing a low-cost versatile moving image processor capable of flexibly changing its multi-functional processing matter and hardware configuration.

This invention is premised on a moving image processor receiving a moving image in a video signal and image-processing the moving image in the digital image frame and outputting a video signal obtained as the processing result.

According to a first embodiment of this invention, a moving image processor comprises an image inputter for converting a video signal being analog into a digital signal in a time series and for generating a control signal synchronized with a frame of the video signal.

The moving image processor of this invention also comprises a plurality of temporary storers into which the digital signal is written in frame units of the video signal.

Further, the moving image processor of this invention comprises a plurality of processor elements respectively for processing image data being memory contents of the plurality of temporary storers. The plurality of processor elements are provided for the plurality of temporary storers on a one-to-one basis.

The moving image processor further comprises a multiplexer, synchronized with the control signal, for sequentially writing the digital signal to the plurality of temporary storers in frame units of the video signal and for sequentially reading the memory contents from the plurality of temporary storers.

Lastly, the moving image processor of this invention comprises an image outputter for sequentially outputting the memory contents from the temporary storers read by the multiplexer after converting them into an analog video signal.

According to a second embodiment of this invention, in addition to the configuration in the first embodiment, the moving image processor further includes a switch signal generator for controlling the multiplexer in correspondence with the control signal generated by the image inputter.

According to a third embodiment of this invention, the moving image processor of this invention comprises, in lieu of the switch signal generator in the second embodiment, an arbitrator for controlling the multiplexer according to the control signal generated by the image inputter, and for delaying the processes by the plurality of processor elements until when the image data are stored in the plurality of temporary storers and the memory contents are completely read from the plurality of temporary storers. Each of the plurality of processor elements emits to the arbitrator a consummation notice signal indicating its processing consummation. The arbitrator delays the readout by the multiplexer from the one of the plurality of temporary storers corresponding to the one of the plurality of processor elements until a receipt of its consummation notice signal.

This invention enables various functions to be easily added, processing matters and hardware structures to be flexibly modified and a high-speed moving image processor to be realized at a low cost, since a plurality of processor elements independently perform parallel processes for a moving image.

BRIEF DESCRIPTION OF THE DRAWINGS

One of skill in the art can easily understand additional features and objects of this invention from the description of the preferred embodiments and some of the attached drawings. In the drawings:

FIG. 4 is a timing chart showing operations pursuant to the first principle of this invention;

FIG. 18B is a timing chart for the operation of the arbitrator in the first case without a wait for an incomplete unit;

FIG. 19B is a timing chart for the operation of the arbitrator in the second case with a wait for an incomplete unit;

FIGS. 20A and 20B are control flowcharts for a processor element;

FIG. 22 is a block diagram of a system based on a combination of the arbitrator and another multiplexer;

DESCRIPTION OF THE PREFERRED EMBODIMENTS

Explanation of the Underlying Principles

A First Principle

Figure 1:
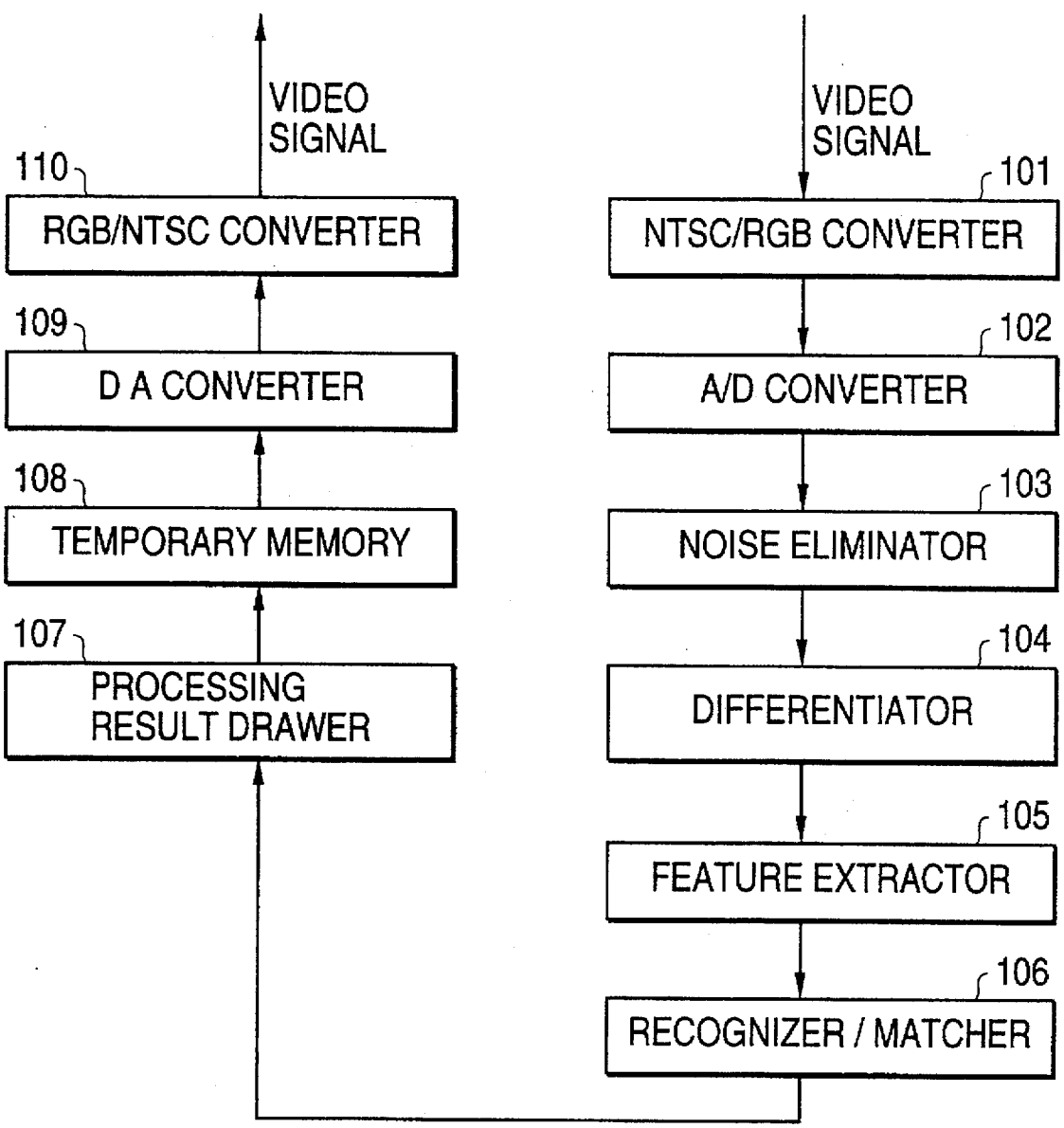
FIG. 1 ("PRIOR ART") is a block diagram of an exemplary conventional moving image processor.
Figure 2:
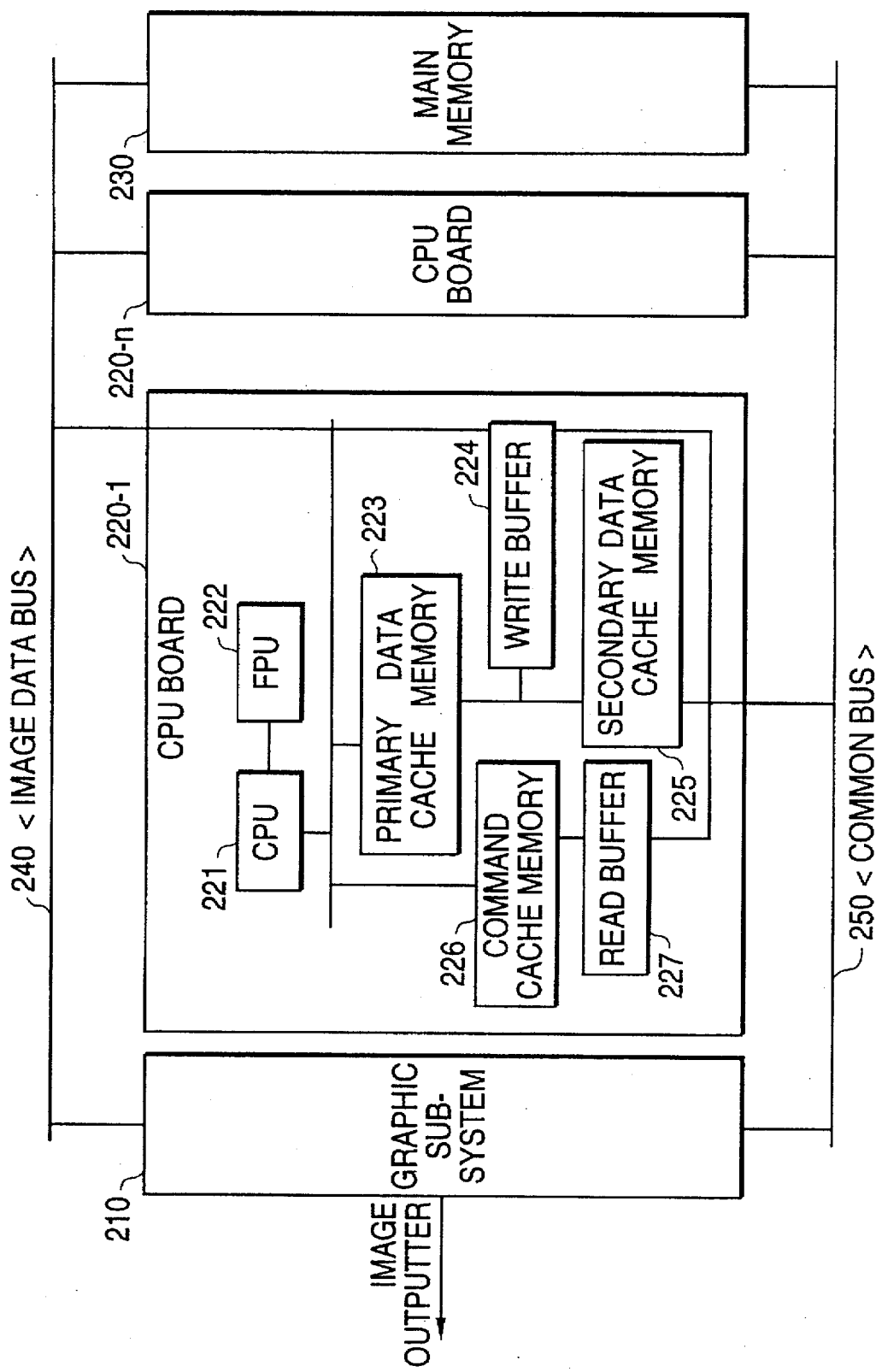
FIG. 2 ("PRIOR ART") is a block diagram of another exemplary conventional moving image processor.
Figure 3:
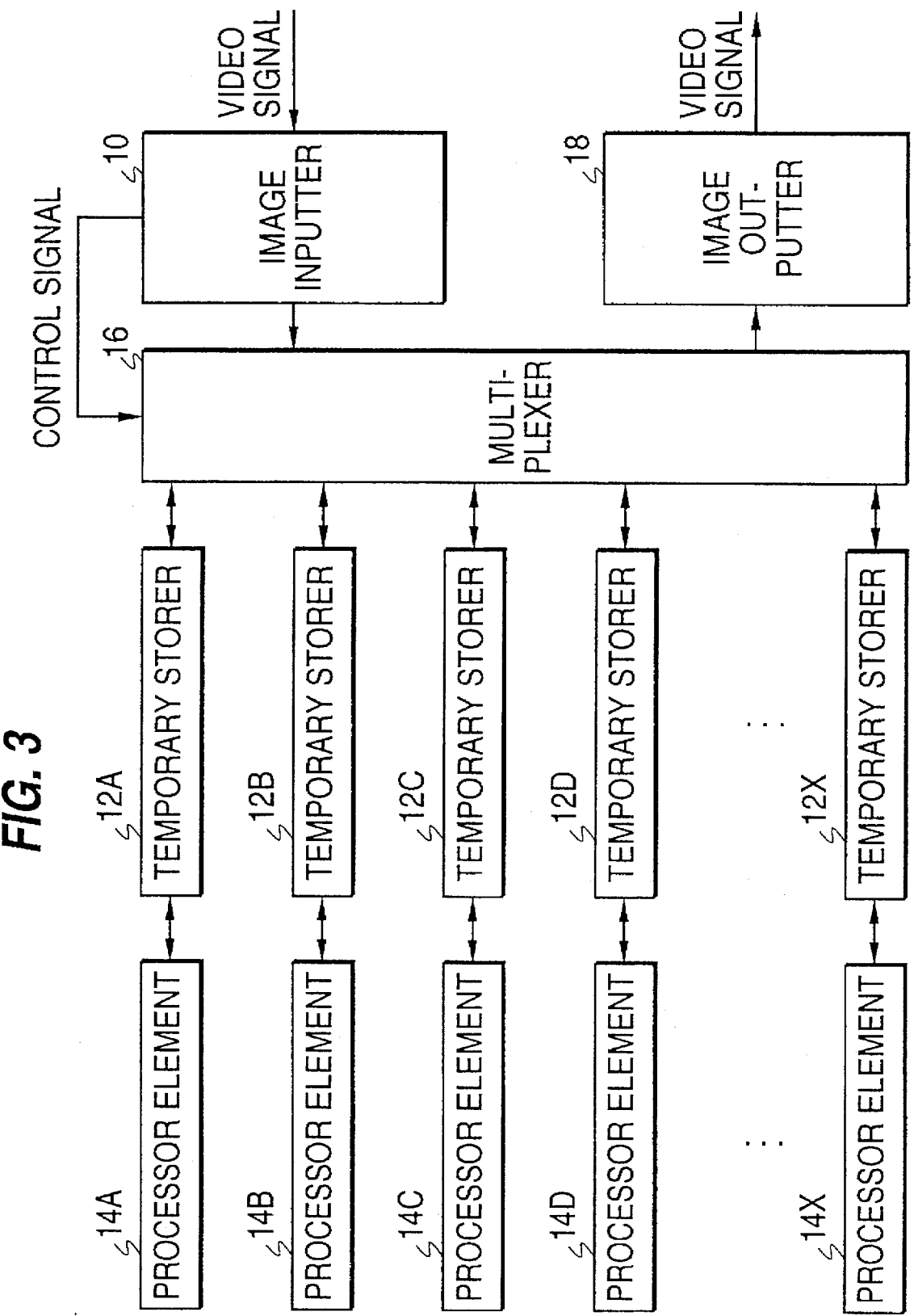
FIG. 3 is a block diagram showing a first principle of this invention.

FIG. 3 is a block diagram showing a first principle of this invention.

A moving image processor pursuant to the first principle of this invention comprises an image inputter 10 for converting an analog a video signal into a digital signal in a time series and for generating a control signal synchronized with a frame of the video signal. The moving image processor also includes a plurality of temporary storers 12 (12A, 12B, . . . , 12X) into which the digital signal is written in frame units of the video signal and a plurality of processor elements 14 (14A, 14B, . . . , 14X) for processing image data being memory contents of the plurality of temporary storers 12 (12A, 12B, . . . , 12X) respectively. The moving image processor further includes a multiplexer 16, synchronized with the control signal, for sequentially writing the digital signal to the plurality of temporary storers 12 (12A, 12B, . . . , 12X) in frame units of the video signal and for sequentially reading the memory contents from the plurality of temporary storers 12 (12A, 12B, . . . , 12X), and an image outputter 18 for sequentially outputting the memory contents of the plurality of temporary storers 12 (12A, 12B, . . . , 12X) read by the multiplexer 16 after converting them into an analog video signal.

FIG. 4 is a timing chart showing operations pursuant to the first principle of this invention. Operations pursuant to the first principle of this invention are explained below by referring to FIGS. 3 and 4.

Here, the plurality of temporary storers 12 (12A, 12B, . . . , 12X) and the plurality of processor elements 14 (14A, 14B, . . . , 14X) shown in FIG. 3 are paired (e.g. temporary storer 12A and processor element 14A) into six [6] units 1, 2, 3, 4, 5 and 6.

Because the multiplexer 16 shown in FIG. 3 operates in frame units of the video signal by the control signal from the image inputter 10, the six [6] units 1, 2, 3, 4, 5 and 6 independently perform, in staggered parallel, processes for each frame at every six [6] frame timings, such as {0, 1, 2, 3, 4 and 5} and {6, 7, 8, 9, 10 and 11}. The six [6] processes for each one [1] frame have a sequential skew of one [1] frame timing, and include inputs of the digital signal in a time series to the plurality of temporary storers 12 (12A, 12B, . . . , 12X) during an image processing and also include outputs of the digital signal in a time series from the plurality of temporary storers 12 (12A, 12B, . . . , 12X) during a moving image reconstruction. That is, the six [6] units 1, 2, 3, 4, 5 and 6 share processes for every frame and independently perform the processes in staggered parallel.

Consequently, it becomes possible to extend the time allowed for the six [6] units 1, 2, 3, 4, 5 and 6 to process one [1] frame to six [6] frame timings and to reduce the memory access speed and the processing speed to one-sixth [⅙].

Accordingly, a provision of a plurality of conventional lower-performance processors (units) enable a moving image to be processed at a low cost as with a single higher performance processor.

Also, because the number of units can be adjusted to the required processing power, hardware can be modified quite easily.

Further, because respective units are not pipelined, they can independently operate in parallel, which makes it easier to flexibly alter the processing matters, such as writing image data created by the plurality of processor elements 14 (14A, 14B, . . . , 14X) respectively into the plurality of temporary storers 12 (12A, 12B, . . . , 12X).

A Second Principle

Figure 5:
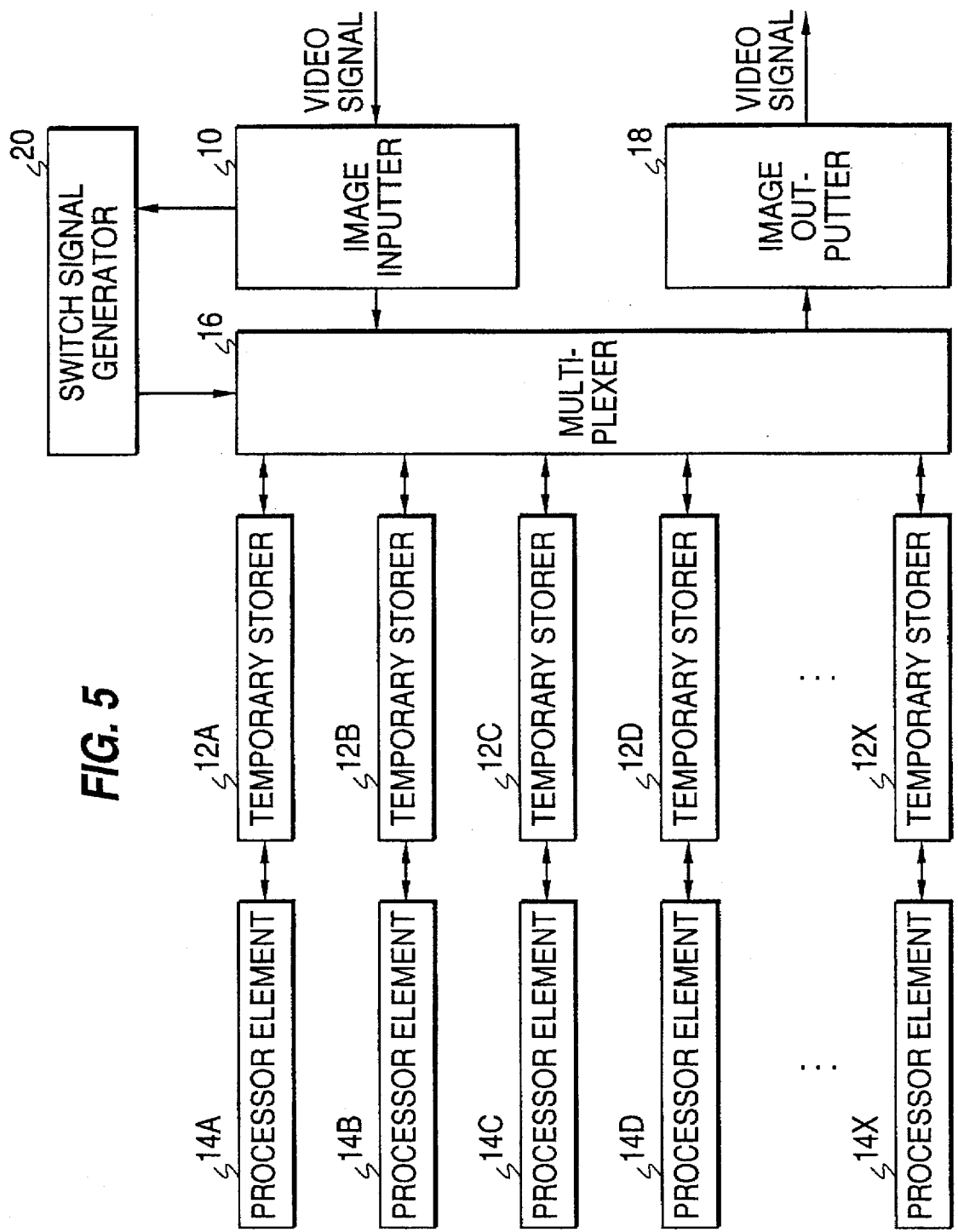
FIG. 5 is a block diagram showing a second principle of this invention.

FIG. 5 is a block diagram showing a second principle of this invention.

A moving image processor pursuant to the second principle of this invention comprises an image inputter 10 for converting an analog video signal into a digital signal in a time series and for generating a control signal synchronized with a frame of the video signal and a plurality of temporary storers 12 (12A, 12B, . . . , 12X) into which the digital signal is written in frame units of the video signal. The moving image processor further includes a plurality of processor elements 14 (14A, 14B, . . . , 14X) for processing image data being memory contents of the plurality of temporary storers 12 (12A, 12B, . . . , 12X), respectively, and a multiplexer 16 for sequentially writing pieces split from the digital signal converted from one [1] frame of the video signal respectively to the plurality of temporary storers 12 (12A, 12B, . . . , 12X) and for sequentially reading the memory contents from the plurality of temporary storers 12 (12A, 12B, . . . , 12X). The moving image processor also includes a switch signal generator 20 for controlling the multiplexer 16 in correspondence with the control signal generated by the image inputter 10 and an image outputter 18 for sequentially outputting the memory contents of the plurality of temporary storers 12 (12A, 12B, . . . , 12X) read by the multiplexer 16 after converting them into an analog video signal.

Figure 6:
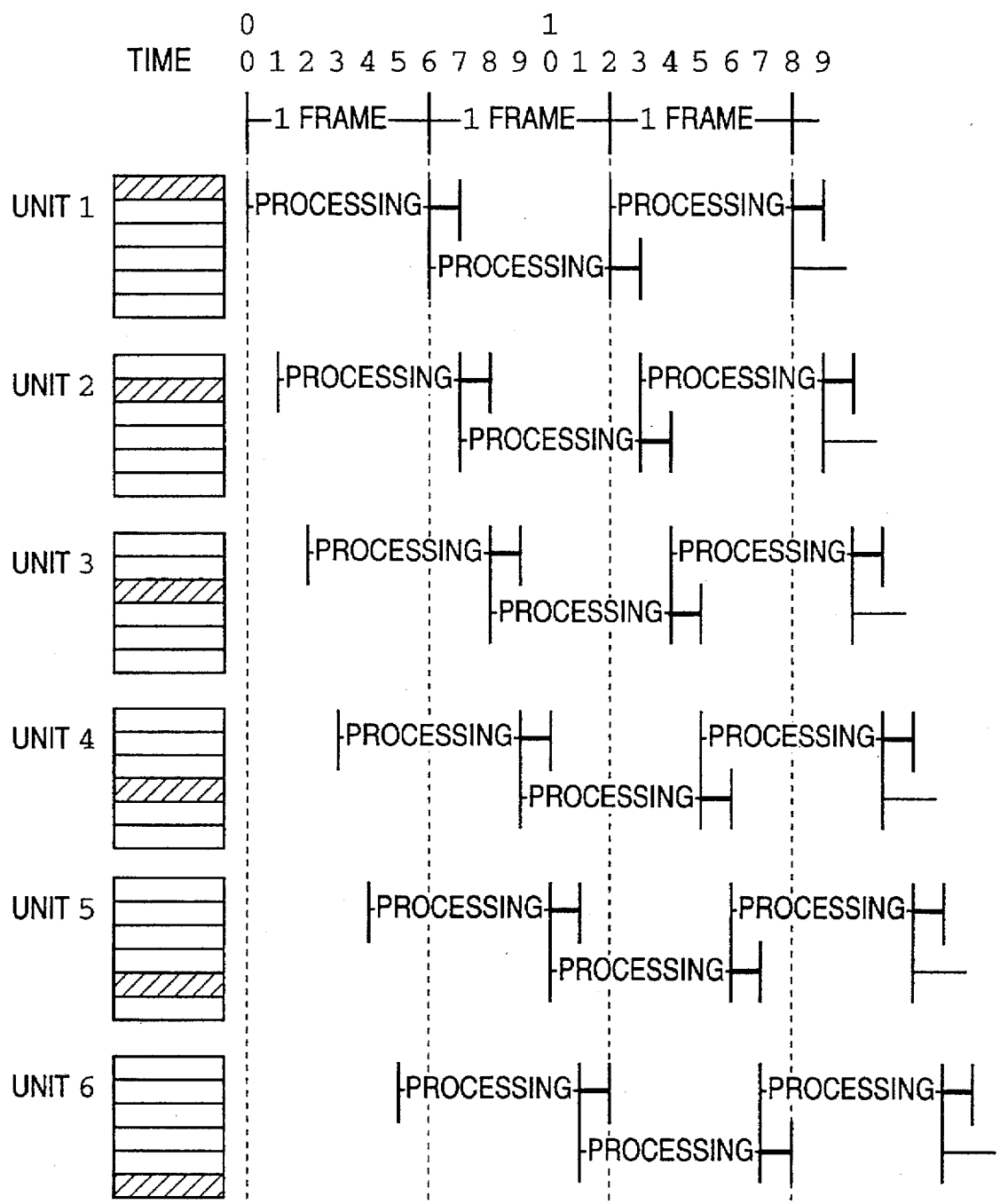
FIG. 6 is a timing chart showing operations pursuant to the second principle of this invention.

FIG. 6 is a timing chart showing operations pursuant to the second principle of this invention.

Operations pursuant to the second principle of this invention are explained below by referring to FIG. 6.

Here, six [6] units 1, 2, 3, 4, 5 and 6 independently perform parallel processes each for one-sixth [⅙] of respective frames.

A Third Principle

Figure 7:
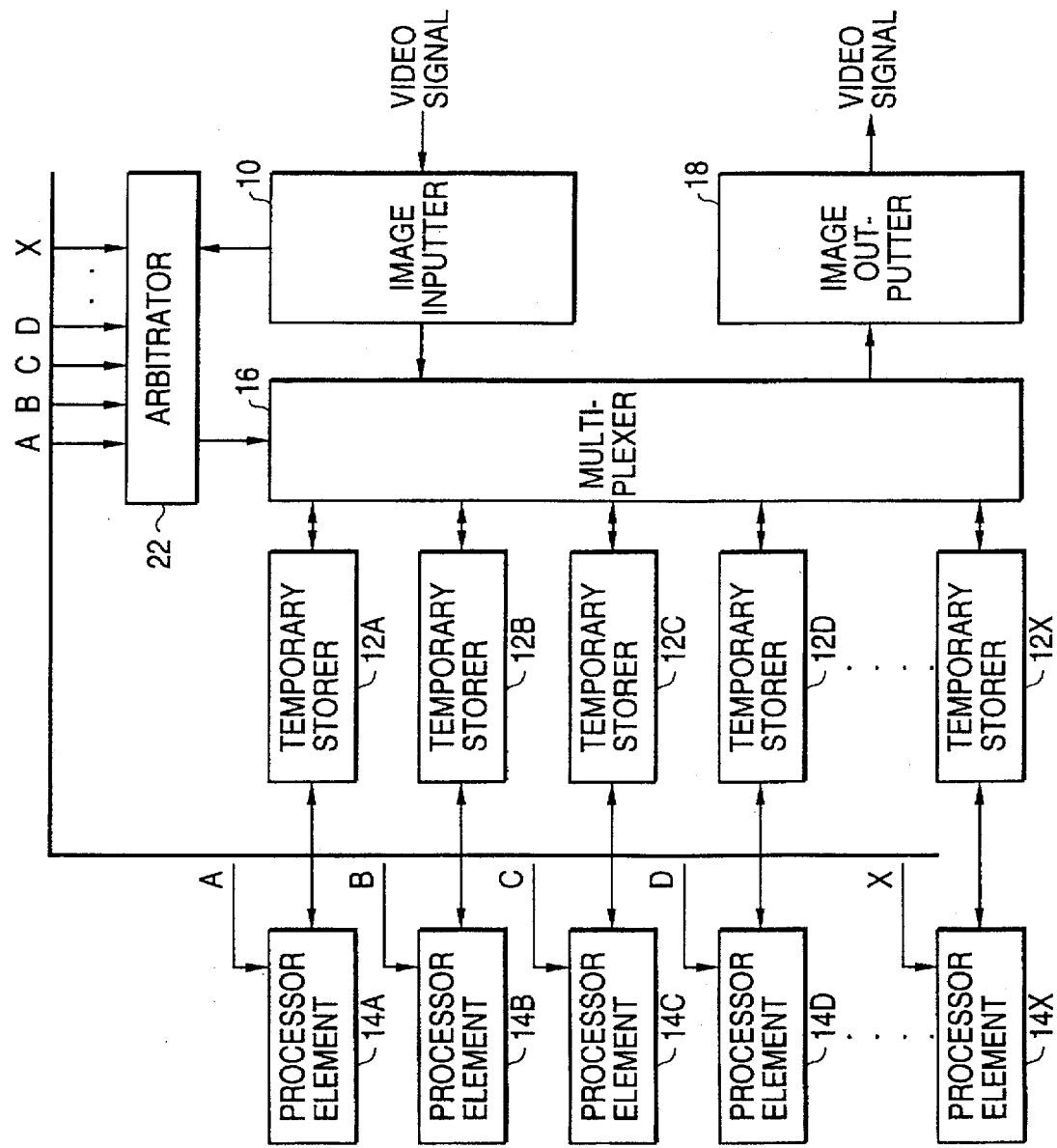
FIG. 7 is a block diagram showing a third principle of this invention.

FIG. 7 is a block diagram showing a third principle of this invention.

A moving image processor pursuant to the third principle of this invention comprises an image inputter 10 for converting an analog video signal into a digital signal in a time series and for generating a control signal synchronized with a frame of the video signal and a plurality of temporary storers 12 (12A, 12B, . . . , 12X) into which the digital signal is written in frame units of the video signal. The moving image processor also includes a plurality of processor elements 14 (14A, 14B, . . . , 14X) for processing image data being memory contents of the plurality of temporary storers 12 (12A, 12B, . . . , 12X), respectively and for emitting consummation notice signals indicating processing consummations; a multiplexer 16, synchronized with the control signal, for sequentially writing the digital signal converted from one [1] frame of the video signal to the plurality of temporary storers 12 (12A, 12B, . . . , 12X) and for sequentially reading the memory contents from the plurality of temporary storers 12 (12A, 12B, . . . , 12X). The moving image processor further includes an image outputter 18 for sequentially outputting the memory contents of the temporary storers 12 (12A, 12B, . . . , 12X) read by the multiplexer 16 after converting them into an analog video signal and an arbitrator 22 for delaying a readout by the multiplexer 16 from the one in the plurality of temporary storers 12 (12A, 12B, . . . , 12X) corresponding to the one in the plurality of processor elements 14 (14A, 14B, . . . , 14X) whose consummation notice signal has not yet arrived.

Operations pursuant to the third principle of this invention are explained below.

Here, although six [6] units 1, 2, 3, 4, 5 and 6 independently perform parallel six [6] processes for each one [1] frame as with the configuration to the first principle of this invention, because the arbitrator 22 delays an output of a frame not yet completely processed until the six [6] units 1, 2, 3, 4, 5 and 6 complete the processes for it, a partially drawn fragmentary image is not displayed, thereby ensuring constantly good quality of a moving image.

DETAILED DESCRIPTION OF PREFERRED EMBODIMENTS

A First Preferred Embodiment

Figure 8:
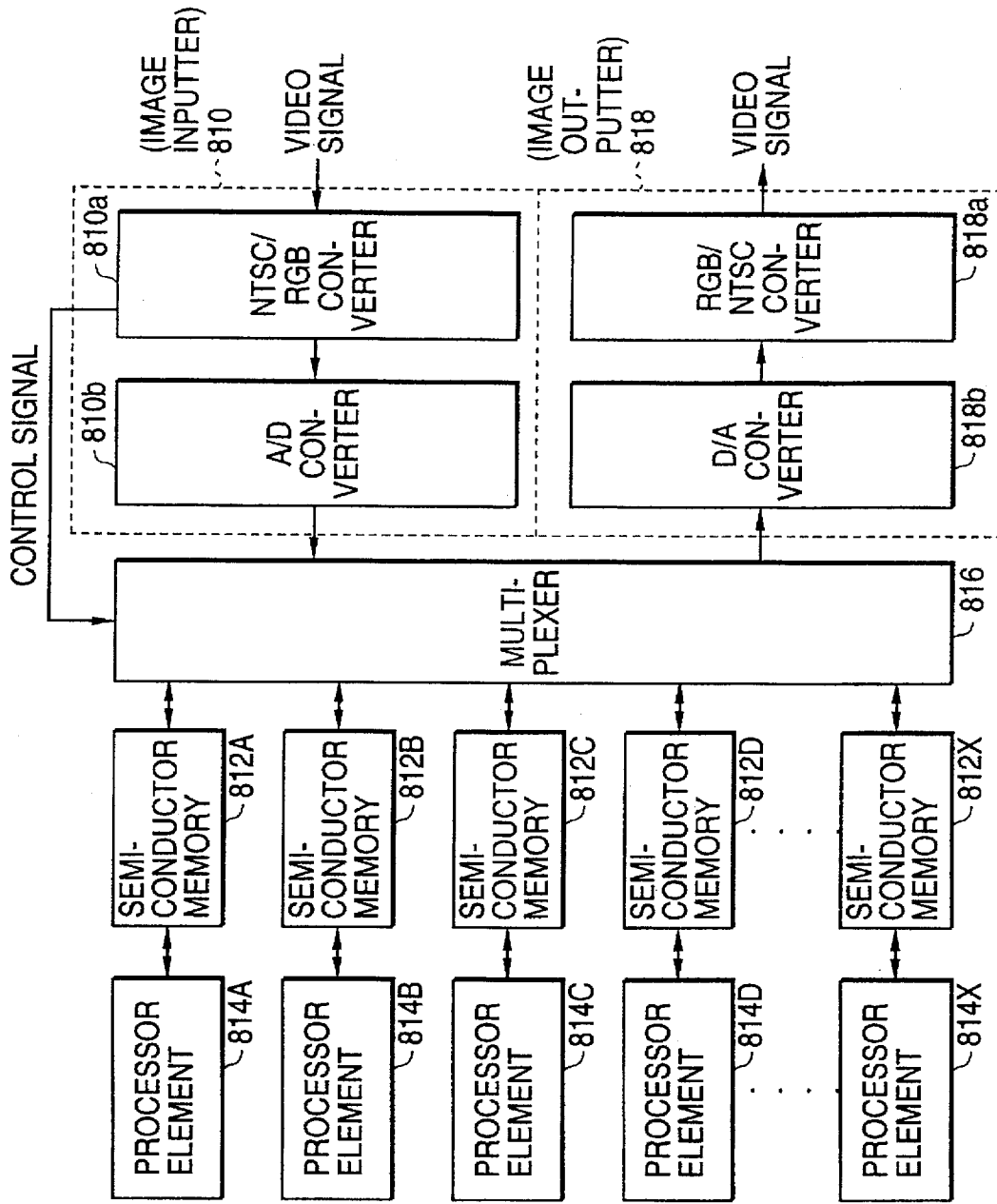
FIG. 8 is a block diagram of a first preferred embodiment of this invention.

FIG. 8 is a block diagram of a first preferred embodiment of this invention.

The first preferred embodiment shown in FIG. 8 is based on the first principle of this invention shown in FIG. 3.

The image inputter 10 shown in FIG. 3 converts a color picture signal (an analog video signal) to an RGB digital signal in a time series, as well as generates a control signal synchronized with a frame of the video signal. Therefore, an image inputter 810 comprises an NTSC/RGB converter 810a for converting an NTSC signal into an RGB signal and an A/D converter 810b for converting the RGB signal obtained by the NTSC/RGB converter 810a into a digital signal in a time series.

The plurality of temporary storers 12 (12A, 12B, . . . , 12X) shown in FIG. 3 pursuant to the first principle comprise a plurality of semiconductor memories 812 (812A, 812B, . . . , 812X) each comprising a dual-port memory having a memory capacity enough for recording data of two [2] frames for an input/output purpose. The digital signal is written into the plurality of semiconductor memories 812 (812A, 812B, . . . , 812X) in frame units of the video signal. A plurality of processor elements 814 (814A, 814B, . . . , 814X) correspond to the plurality of processor elements 14 (14A, 14B, . . . , 14X) shown in FIG. 3 pursuant to the first principle, and perform the processes, including readouts of image data from the plurality of semiconductor memories 812 (812A, 812B, . . . , 812X) noise eliminations and write-ins of the image data back to the plurality of semiconductor memories 812 (812A, 812B, . . . , 812X) during an image processing, and write-ins of image data of a computer graphic into the plurality of semiconductor memories 812 (812A, 812B, . . . , 812X) during a moving image reconstruction.

A multiplexer 816 corresponds to the multiplexer 16 shown in FIG. 3 pursuant to the first principle and controls the write-ins to and readouts from the plurality of semiconductor memories 812 (812A, 812B, . . . , 812X). The multiplexer 816 comprises an IC logic circuit. The multiplexer 816, synchronized with a control signal of the NTSC/RGB converter 810a, sequentially writes the digital signal from the A/D converter 810b to the plurality of semiconductor memories 812 (812A, 812B, . . . , 812X) in frame units of the video signal and sequentially reads the memory contents from the plurality of semiconductor memories 812 (812A, 812B, . . . , 812X).

A D/A converter 818b in an image outputter 818 converts into an analog signal the memory contents read from the plurality of semiconductor memories 812 (812A, 812B, ..., 812X) by the multiplexer 816. Then, an RGB/NTSC converter 818a also in the image outputter 818 converts the analog signal into an NTSC signal (a video signal being analog).

In the first preferred embodiment, picture screen images sequentially inputted into the image inputter 810 are written via the multiplexer 816 into the plurality of semiconductor memories 812 (812A, 812B, ..., 812X) in frame (screen) units, whose processes the plurality of processor elements 814 (814A, 814B, ..., 814X) respectively start.

Then, after the plurality of processor elements 814 (814A, 814B, ..., 814X) complete their processes and write post-processed frame data respectively into the plurality of semiconductor memories 812 (812A, 812B, ..., 812X), the plurality of semiconductor memories 812 (812A, 812B, ..., 812X) sequentially output pictures (frame data) via the multiplexer 816 to the image outputter 818.

Consequently, the first preferred embodiment renders it possible to extend the time allowed for the plurality of processor elements 814 (814A, 814B, ..., 814X) to process one [1] frame by their number and reduce the memory access speed to the plurality of semiconductor memories 812 (812A, 812B, ..., 812X) and processing speed of the plurality of processor elements 814 (814A, 814B, ..., 814X) also by their number.

Accordingly, a provision of a plurality of conventional lower-performance processing units [respectively comprising the plurality of semiconductor memories 812 (812A, 812B, ..., 812X) and the plurality of processor elements 814 (814A, 814B, ..., 814X)] enable low cost hardware to process a moving image as with higher performance conventional hardware.

Also, because the number of processing units can be adjusted to the required processing power, hardware can be modified quite easily. Further, because respective processing units are not pipelined, they can independently operate in parallel, which makes it easier to flexibly alter the processing matters.

The structures of respective parts in the first preferred embodiment are described in further detail below. A control signal is derived from a vertical synchronous signal (VSYNC) by the NTSC/RGB converter 810a and is applied to the multiplexer 816 to switch written/read one of the plurality of semiconductor memories 812 (812A, 812B, ..., 812X).

Figure 9:
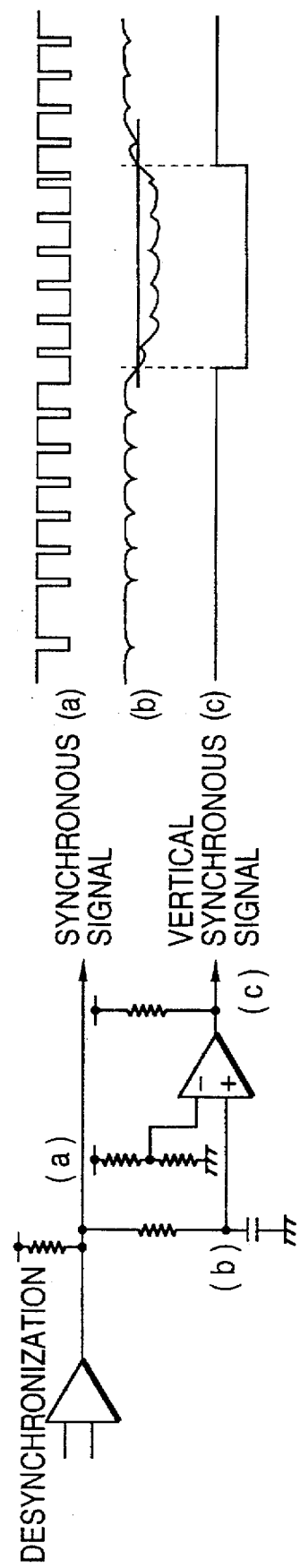
FIG. 9 shows the configuration and operation of a vertical synchronous pulse regenerator.

FIG. 9 shows the configuration and operation of a vertical synchronous pulse regenerator provided in the NTSC/RGB converter 810a.

More specifically, the left hand side of FIG. 9 is a circuit diagram of an extractor for desynchronizing a vertical synchronous signal (VSYNC) from a composite synchronous signal. A signal (a) shown in the right hand side of FIG. 9 represents a composite synchronous signal. A signal (b) shown in the right hand side of FIG. 9 designates a signal at a point (b). A signal (c) shown in the right hand side of FIG. 9 represents a vertical synchronous signal (VSYNC) obtained by an integral circuit and a comparator.

Figure 10:
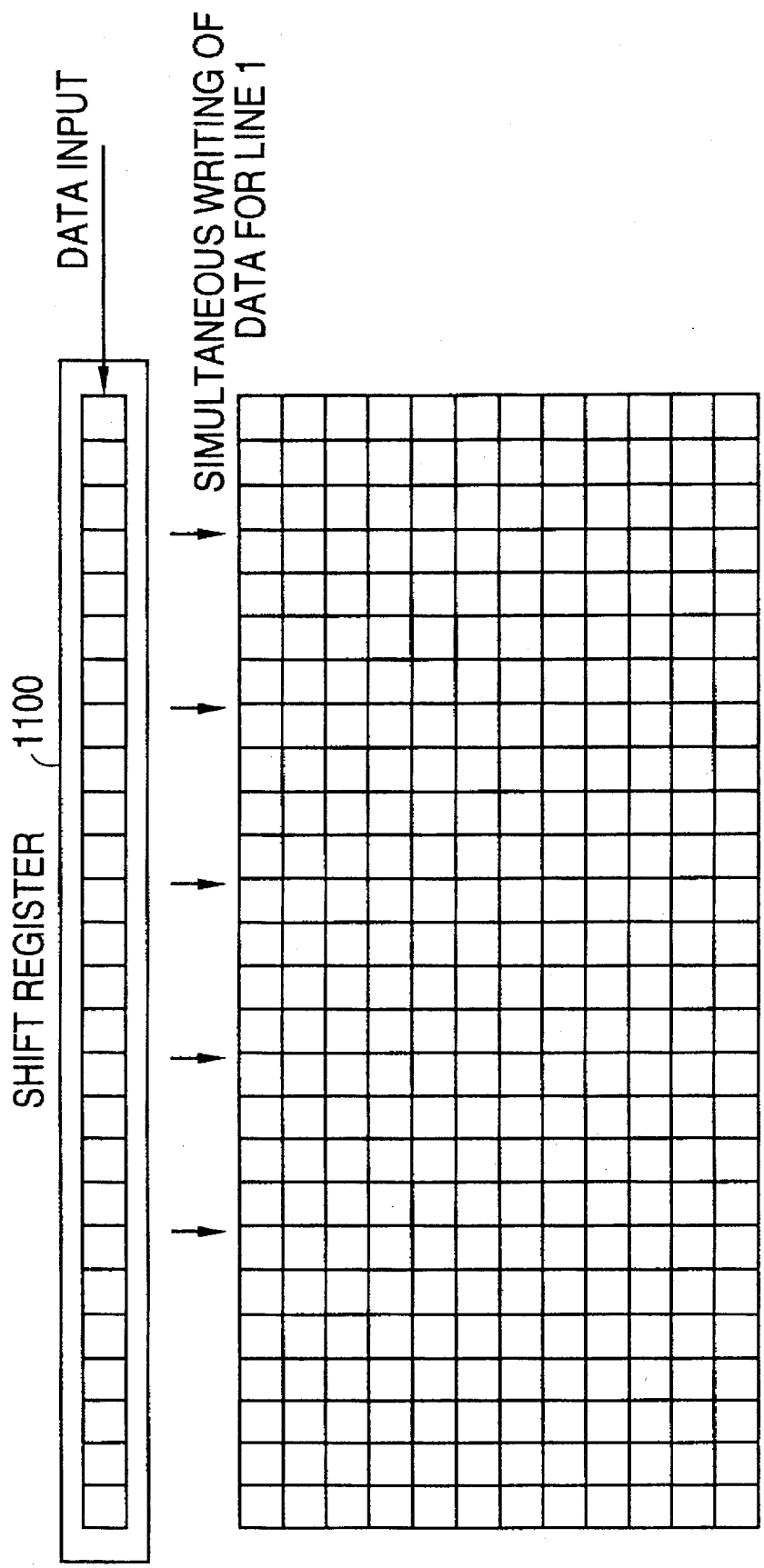
FIG. 10 is an explanatory chart for writing data into a temporary storer, i.e. a semiconductor memory.

FIG. 10 is an explanatory chart for writing data into a temporary storer.

The multiplexer 816 outputs the image data inputted from the image inputter 810 to the plurality of semiconductor memories 812 (812A, 812B, ..., 812X). At this time, image data of one [1] line are sequentially written into a shift register 1100, firstly, as shown in FIG. 10. After the shift register 1100 stores the image data of one [1] line, they are simultaneously written into the plurality of semiconductor memories 812 (812A, 812B, ..., 812X), secondly.

Figure 11:
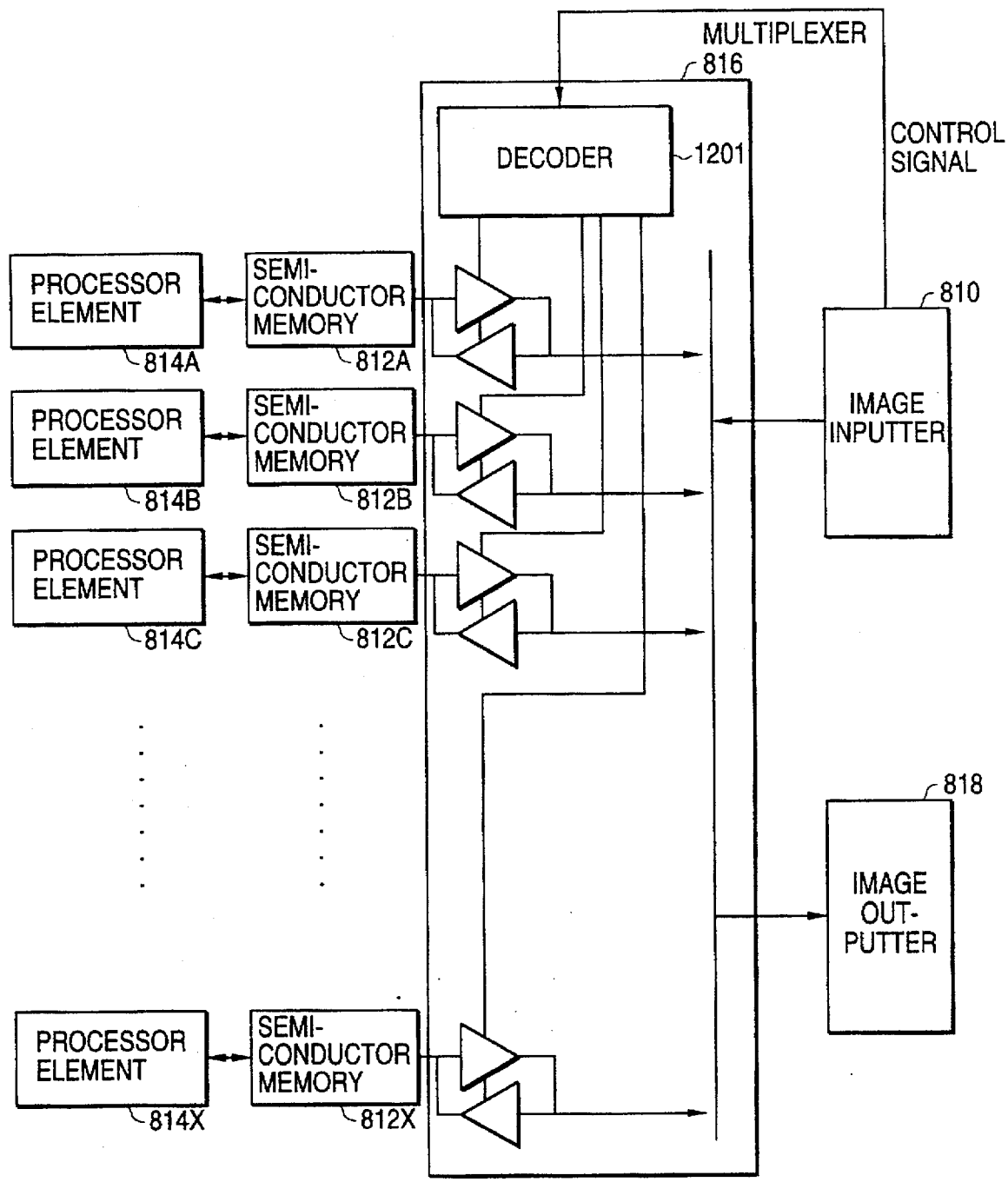
FIG. 11 is a block diagram of a multiplexer shown in the first preferred embodiment.

FIG. 11 is a block diagram of a multiplexer.

The multiplexer 816 comprises primarily a decoder 1201, and a plurality of buffer gates 1202 (1202A, 1202B, ..., 1202X) and a plurality of buffer gates 1203 (1203A, 1203B, ..., 1203X) respectively provided in the plurality of semiconductor memories 812 (812A, 812B, ..., 812X). The plurality of buffer gates 1202 (1202A, 1202B, ..., 1202X) receive as their inputs image data from the image inputter 810 and supply as their outputs the image data respectively to the plurality of semiconductor memories 812 (812A, 812B, ..., 812X). The plurality of buffer gates 1203 (1203A, 1203B, ..., 1203X) receive as their inputs image data respectively from the plurality of semiconductor memories 812 (812A, 812B, ..., 812X) and supply as their outputs the image data to the image outputter 818. The decoder 1201 decodes the control signal which is received from the image inputter 810 and includes the vertical synchronous signal, selects any of the pluralities of buffer gates 1202 (1202A, 1202B, ..., 1202X) and 1203 (1203A, 1203B, ..., 1203X) to be turned ON and turns ON only the selected one. For example, when the control signal turns buffer gate 1202A ON, buffer gate 1202A supplies one [1] frame of image data from the image inputter 810 to semiconductor memory 812A.

Figure 12:
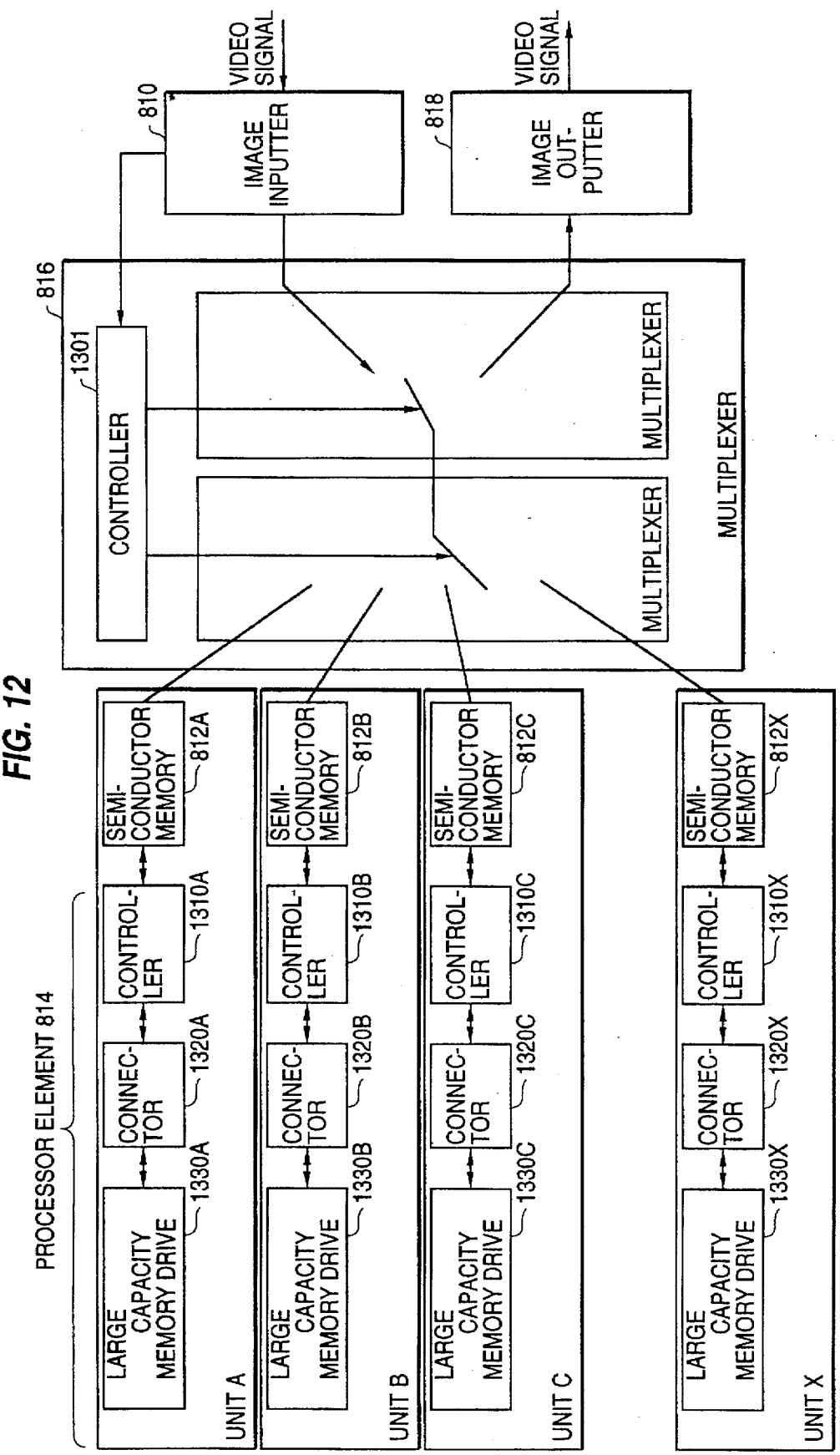
FIG. 12 is an explanatory chart illustrating the configuration of the multiplexer shown in FIG. 11 and used in the first preferred embodiment of this invention.

FIG. 12 is an explanatory chart illustrating the configuration of a multiplexer for use in the first preferred embodiment of this invention.

The multiplexer 816 comprises a controller 1301 corresponding to the decoder 1201 shown in FIG. 12 and multiplexer elements each comprising a group of buffer gates. The group of buffer gates configured as shown in FIG. 10 enable any one of a plurality of units (A, B, ..., X) [respectively comprising the plurality of semiconductor memories 812 (812A, 812B, ..., 812X) paired with the plurality of processor elements 814 (814A, 814B, ..., 814X)] to be connected to the image inputter 810 or the image outputter 818. That is, the multiplexer 816 works both as a multiplexer for selecting either the image inputter 810 or the image outputter 818 and as a multiplexer for selecting one of the plurality of units (A, B, ..., X).

The multiplexer structure of this invention shown in FIG. 12 causes the image data supplied from the image inputter 810 to be sequentially written into any of the plurality of semiconductor memories 812 (812A, 812B, ..., 812X). It also causes the image data read, e.g. according to the NTSC output cycle, from any of the plurality of semiconductor memories 812 (812A, 812B, ..., 812X) to be outputted from the image outputter 818. Hence, because a division and an integration of an image is performed by using a sequential digital image signal, it does not require an address bus, a DMA controller or a bus controller, and costs less than a multiplexer structure using a bus system (which is shown in FIG. 22).

The first preferred embodiment quite easily realizes such things as regenerating a picture after eliminating only the commercials from the recorded picture by successively playing prerecorded picture in a desired sequence and creating a picture expression in which two [2] scenes are contemporaneously in progress by alternately regenerating two [2] scenes separately recorded.

Figure 13:
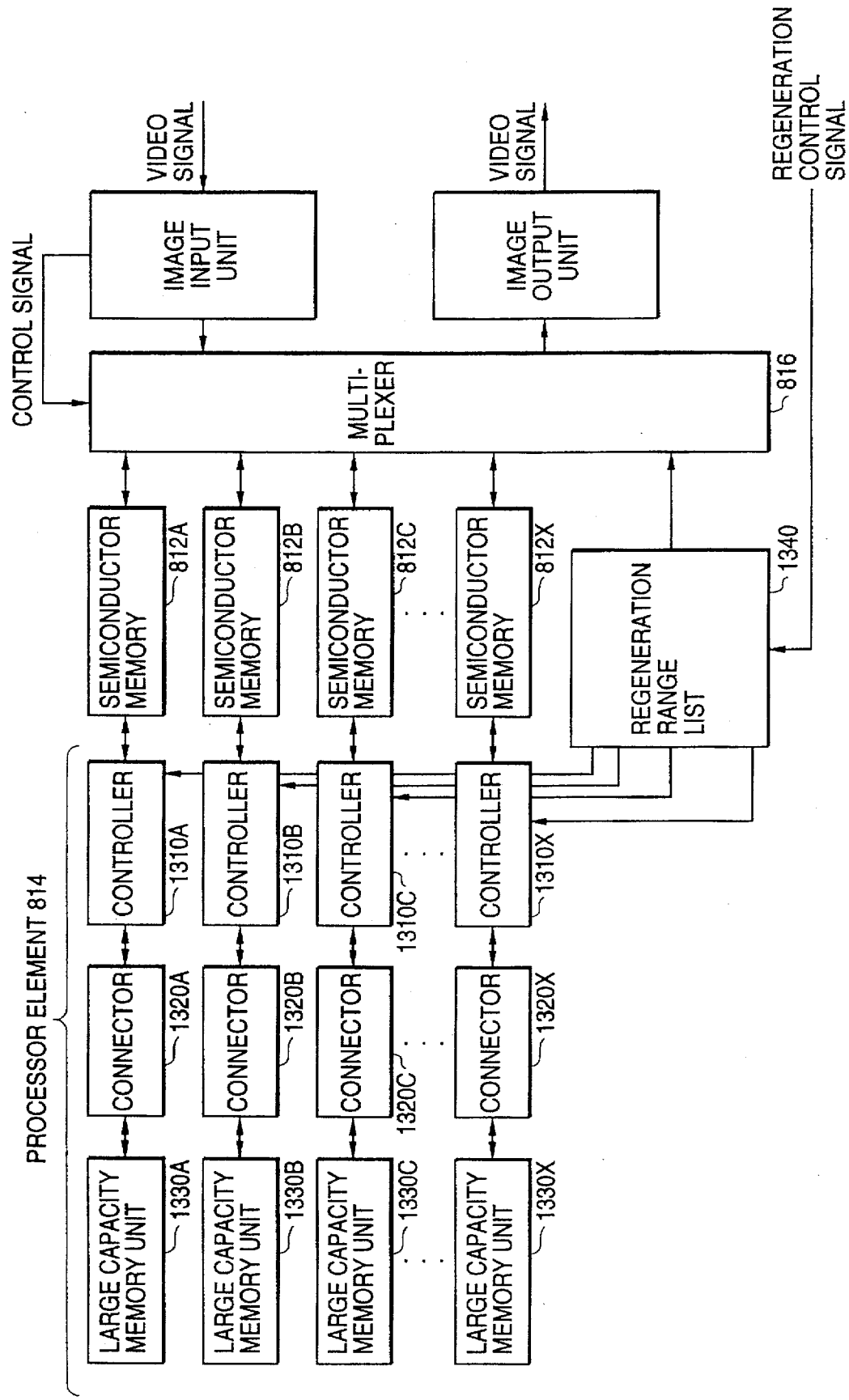
FIG. 13 shows a regeneration range list unit used on its first preferred embodiment.

FIG. 13 shows a circuit in which a range of regeneration frames can be controlled.

As described before, the plurality of units (A, B, ..., X) respectively comprise the plurality of semiconductor memories 812 (812A, 812B, ..., 812X) paired with the plurality of processor elements 814 (814A, 814B, ..., 814X). The plurality of processor elements 814 (814A, 814B, ..., 814X) respectively comprise a plurality of controllers 1310 (1310A, 1310B, ..., 1310X), a plurality of connectors 1320 (1320A, 1320B, ..., 1320X) and a plurality of large capacity memory devices 1330 (1330A, 1330B, ..., 1330X). By using a memory unit in each of the plurality of large capacity memory devices 1330 (1330A, 1330B, ..., 1330X) as a block, picture frames 0 through 5 are stored in a sequence from A0 (block 0 in unit A), through B0 (block 0 in unit B), C0 (block 0 in unit C) and D0 (block 0 in unit D), to A1 (block 1 in unit A).

Figure 14:
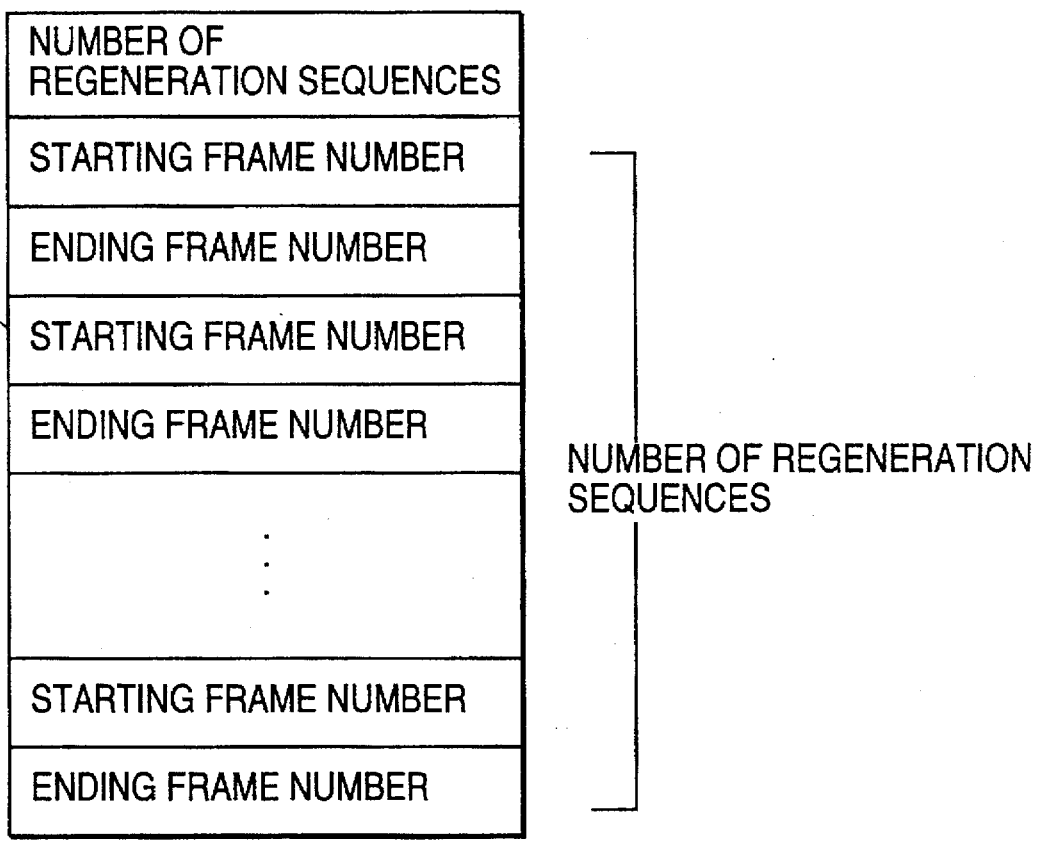
FIG. 14 designates an explanatory view of a regeneration range list.

Assume here that a host designates a frame range to be played by a regeneration control signal. A designated frame number is outputted from regeneration range list unit 1340. The regeneration range list unit 1340 is referred to of the multiplexer 816 and each controller 1310. A content of the regeneration range list unit 1340 is shown in FIG. 14 and the regeneration range list 1341 comprises the number of regeneration sequences, and a plurality of pairs of the starting frame number and ending frame number.

For example, one hundred fiftieth [150th] frame through one hundred ninety-ninth [199th] frame are set in a regeneration range list 1341. The plurality of controllers 1310 (1310A, 1310B, ..., 1310X) respectively in the plurality of units A, B, ..., X analyze this, and regenerate the memory blocks C37 through D49. The multiplexer 816 starts its connection from unit C, sequentially changes its connection and terminates its connection at unit D.

Similarly, when one hundred fiftieth [150th] frame through one hundred eighty-ninth [189th] frame and two hundred fortieth [240th] frame through two hundred eighty-ninth [289th] frame are set in a regeneration range list 1341 for their successive plays, the plurality of controllers 1310 (1310A, 1310B, ..., 1310X) respectively in the plurality of units A, B, ..., X analyze this, and play the memory blocks C37 through B47 and A60 through B72. The multiplexer 816 starts its connection from unit C, reverts to unit A on reaching unit B after ten [10] cycles, and terminates its connection at unit B after twelve [12] cycles.

Thus, a provision of a regeneration range list 1341 enables where the plurality of controllers 1310 (1310A, 1310B, ..., 1310X) respectively in the units A, B, ..., X and the multiplexer 816 should read and which one of the plurality of units A, B, ..., X is to be connected to be known beforehand, thereby allowing a picture to be randomly played successively.

A Second Preferred Embodiment

Figure 15:
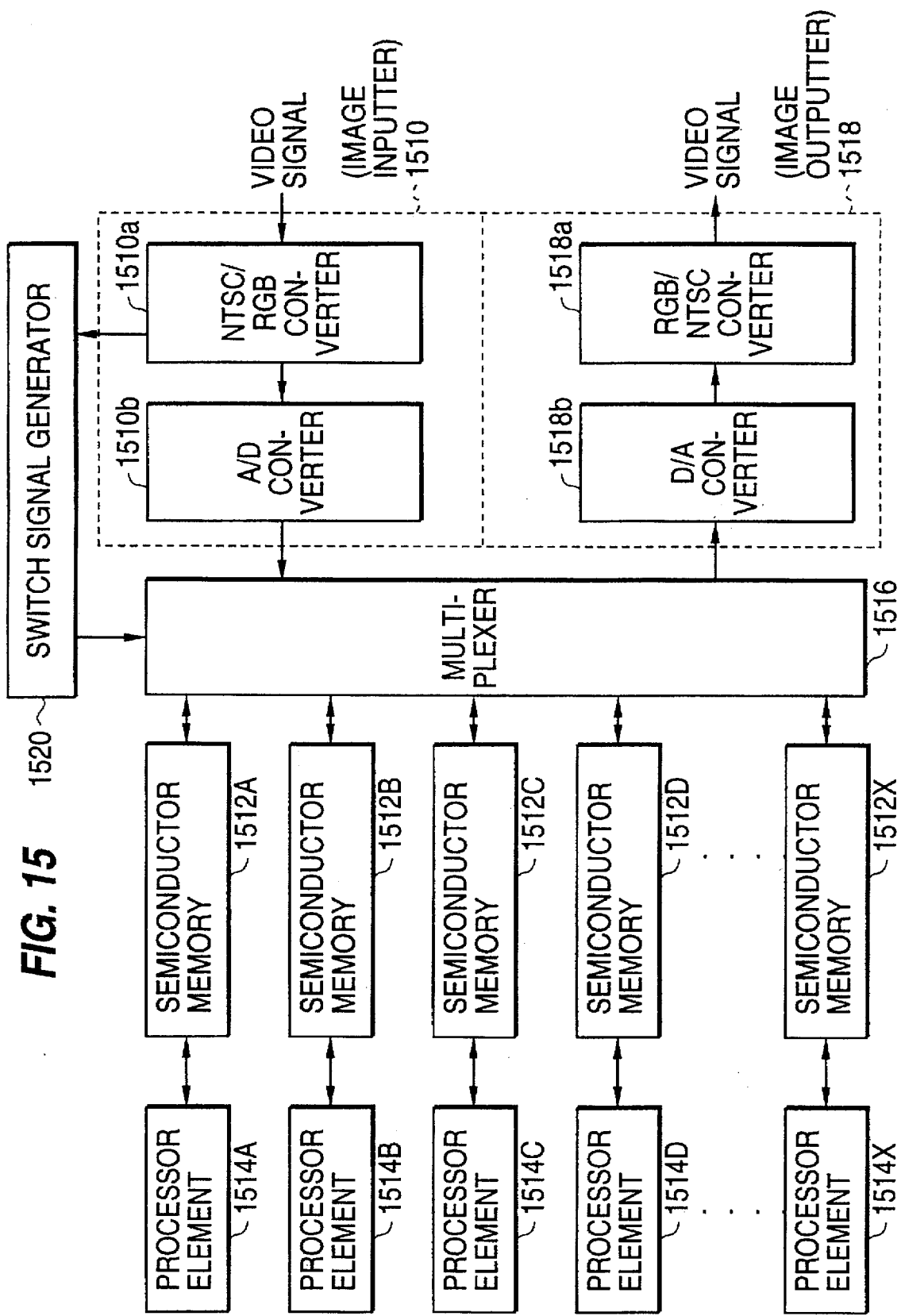
FIG. 15 is a block diagram of a second preferred embodiment of this invention.

FIG. 15 is a block diagram of a second preferred embodiment of this invention.

The second preferred embodiment shown in FIG. 15 is based on the second principle of this invention shown in FIG. 5.

A switch signal generator 1520 shown in FIG. 15 outputs to a multiplexer 1516 an operation control signal according to a control signal (vertical/horizontal synchronous signal) from an image inputter 1510.

Figure 16:
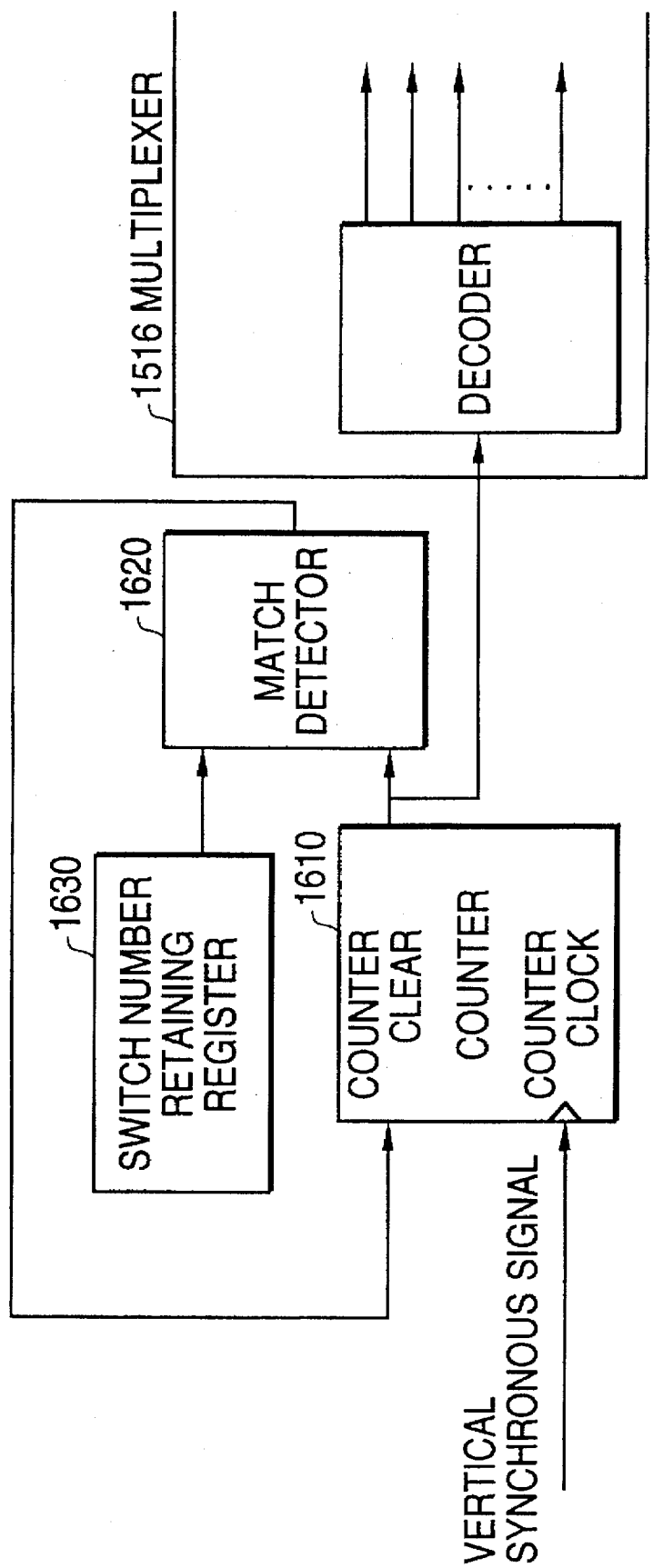
FIG. 16 is a block diagram of a switch signal generator shown in FIG. 15.

FIG. 16 is a block diagram of a switch signal generator shown in FIG. 15.

The switch signal generator 1520 is a counter circuit using an IC logic circuit.

The switch signal generator 1520 comprises a counter 1610, a match detector 1620 and a switch number retaining register 1630. On receiving a vertical synchronous signal as its clock, the counter 1610 counts up and supplies the Counter output to a decoder of the multiplexer 1516. The multiplexer 1516 for the second preferred embodiment has a pursuant to the multiplexer 816 for the first preferred embodiment shown in FIG. 12.

The counter 1610 also supplies its counter output to the match detector 1620, which also receives as another input a value of the switch number retaining register 1630. When a value preset in the switch number retaining register 1630 matches the value of the counter output, the counter 1610 clears its value.

In the second preferred embodiment, a digital signal being RGB converted from a frame of a video signal is time-divided and sequentially written into a plurality of semiconductor memories 1512 (1512A, 1512B, ..., 1512X). Therefore, a time-division number is set in the switch number retaining register 1630 of the switch signal generator 1520. The time-division number is a quotient obtained by dividing the number of processing units [a plurality of units respectively comprising the plurality of semiconductor memories 1512 (1512A, 1512B, ..., 1512X) and a plurality of processor elements 1514 (1514A, 1514B, ..., 1514X)] by the number of lines [stored in the plurality of semiconductor memories 1512 (1512A, 1512B, ..., 1512X)] in a frame. Then, a vertical synchronous signal is counted, and when image data for the number of the lines are written into semiconductor memory 1512A, the next line emits a signal for writing image data into semiconductor memory 1512B.

Therefore, a plurality of processing units share the processes for a single image.

A Third Preferred Embodiment

Figure 17:
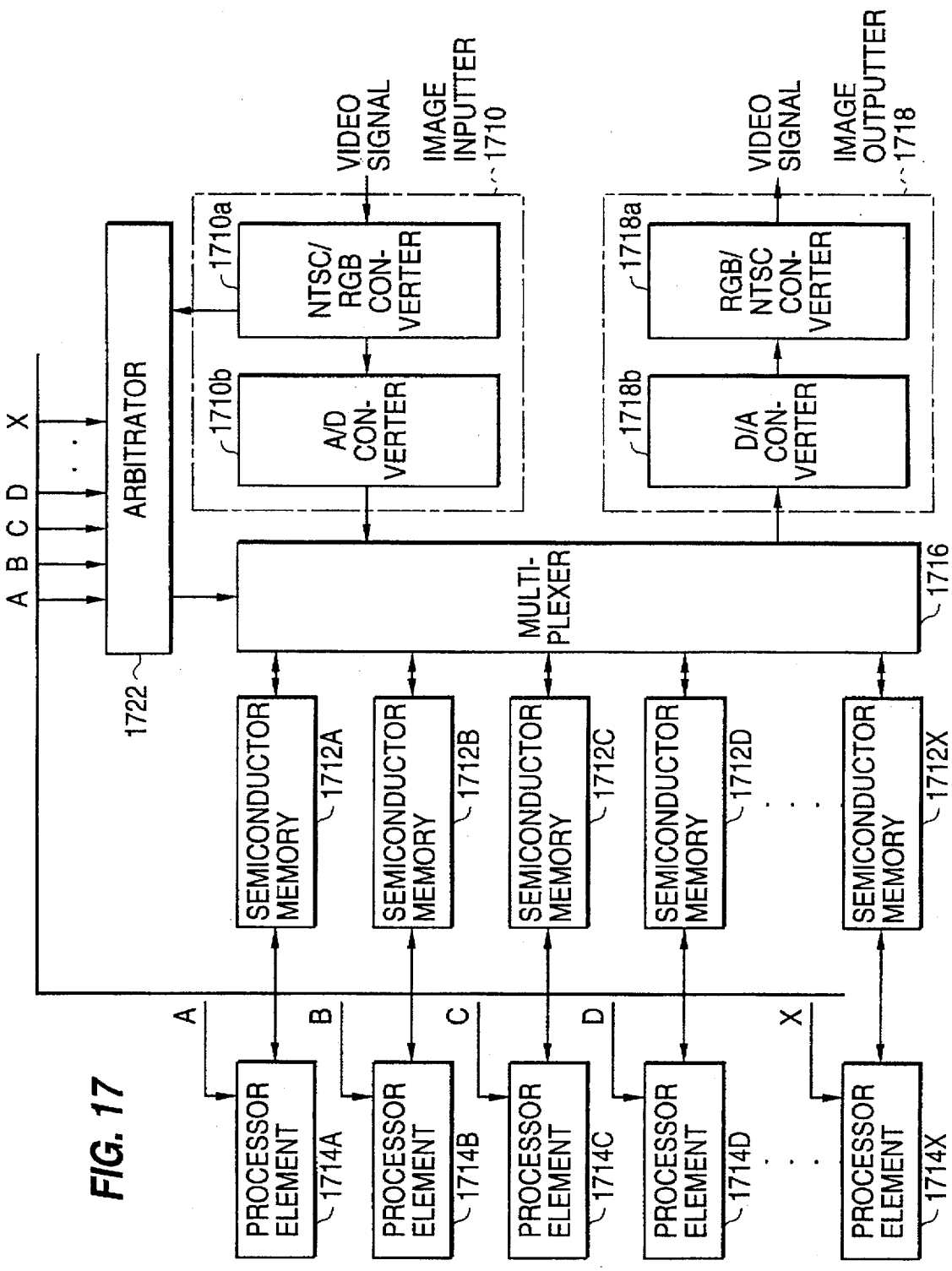
FIG. 17 is a block diagram of a third preferred embodiment of this invention.

FIG. 17 is a block diagram of a third preferred embodiment of this invention.

The third preferred embodiment shown in FIG. 17 is based on the third principle of this invention shown in FIG. 7.

The configuration of the third preferred embodiment shown in FIG. 17 is obtained by adding an arbitrator 1722 to the configuration of the first preferred embodiment shown in FIG. 8.

In third preferred embodiment, a plurality of image processing units A, B, ..., X respectively comprise a plurality of semiconductor memories 1712 (1712A, 1712B, ..., 1712X) and a plurality of processor elements 1714 (1714A, 1714B, ..., 1714X) each being connected to a large capacity memory device. The third preferred embodiment is premised on a system for displaying a moving image by sequentially switching an image obtained as processing results from the plurality of image processing units. It has a feature that a provision of the arbitrator 1722 prevents a partly processed fragmentary image from being displayed.

The arbitrator 1722 checks, synchronized with a timing signal (e.g. a VSYNC: vertical synchronous signal), whether or not the next displaying one of the plurality of image processing units has completed its image creation. If its image creation is complete, the arbitrator 1722 sends to a multiplexer 1716 for switching the currently displaying one to the next displaying one of the plurality of image processing units. If the image creation is incomplete, the arbitrator 1722 causes the currently displayed image to be continually displayed. Because generally two [2] or three [3] displays of the same frame does not arouse any awkwardness, it is all right to substitute a missing image by a preceding image. The multiplexer 1716 is constructed as shown in FIGS. 11 and 12.

There are two [2] methods for dealing with the missing images.

[1] By ignoring an incomplete image processing unit, skip to the image processing unit next to the incomplete image processing unit at the next timing. (Refer to FIGS. 18A, 18B and 18C.)

[2] By waiting for the processing completion of an incomplete image processing unit, switch the now-complete incomplete image processing unit at the next timing. (Refer to FIGS. 19A, 19B and 19C.)

Figure 18A:
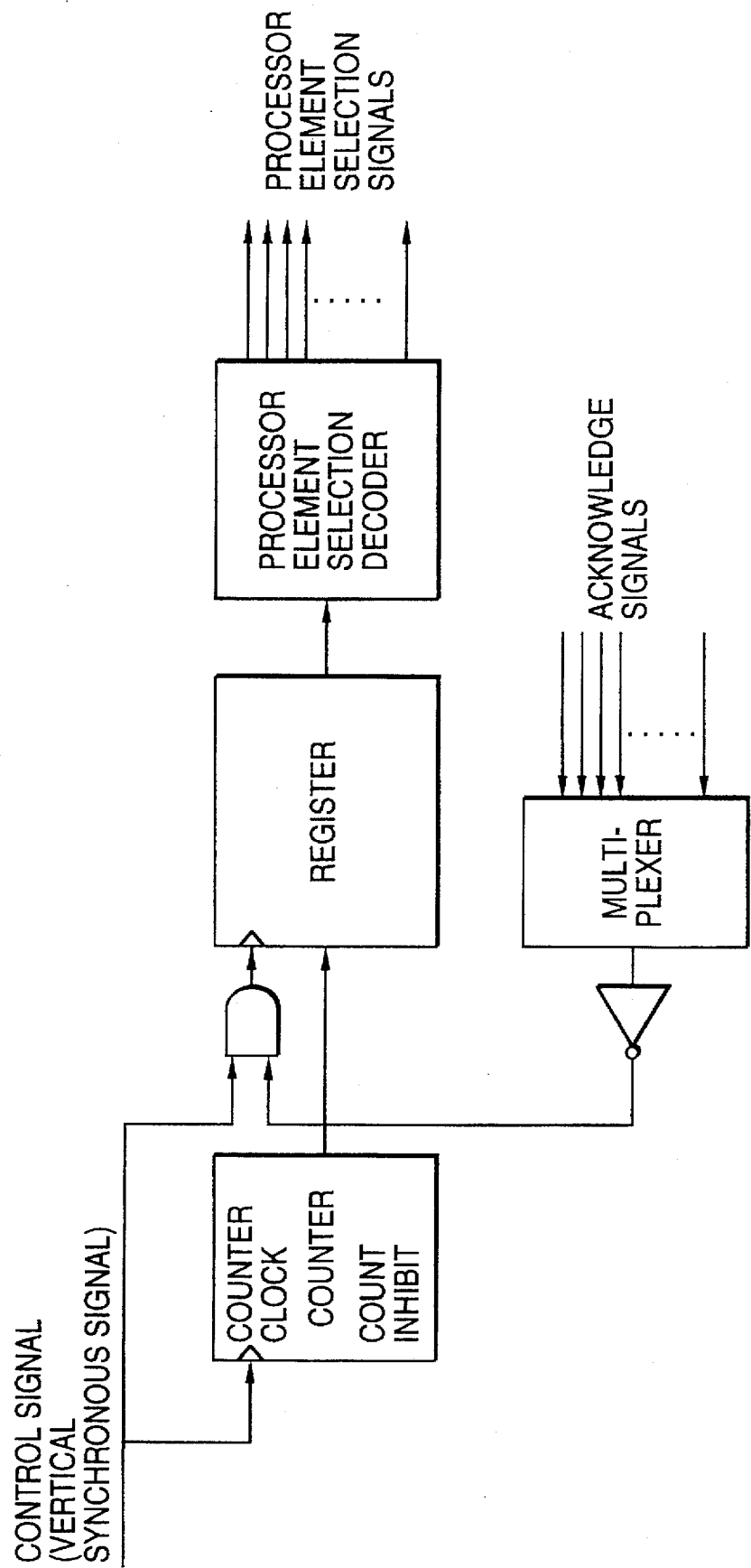
FIG. 18A is a block diagram of an arbitrator for an operation in a first case without a wait for an incomplete unit.

FIG. 18A is a block diagram of an arbitrator for an operation in a first case without a wait for an incomplete unit.

A plurality of acknowledge signals and a plurality of processor element selection signals control the arbitrator 1722 and the plurality of processor elements 1714 (1714A, 1714B, . . . , 1714X) in the respective image processing units. Each of the plurality of acknowledge signals notifies the arbitrator 1722 of the completion of the process by the corresponding one of the plurality of processor elements 1714 (1714A, 1714B, . . . , 1714X). Each of the plurality of processor element selection signals notifies of the corresponding one of plurality of the processor elements 1714 (1714A, 1714B, . . . , 1714X) of whether or not the multiplexer 1716 selects it. Thus, the plurality of processor elements 1714 (1714A, 1714B, . . . , 1714X) can come to know whether or not the home units are being selected.

Figure 18C:
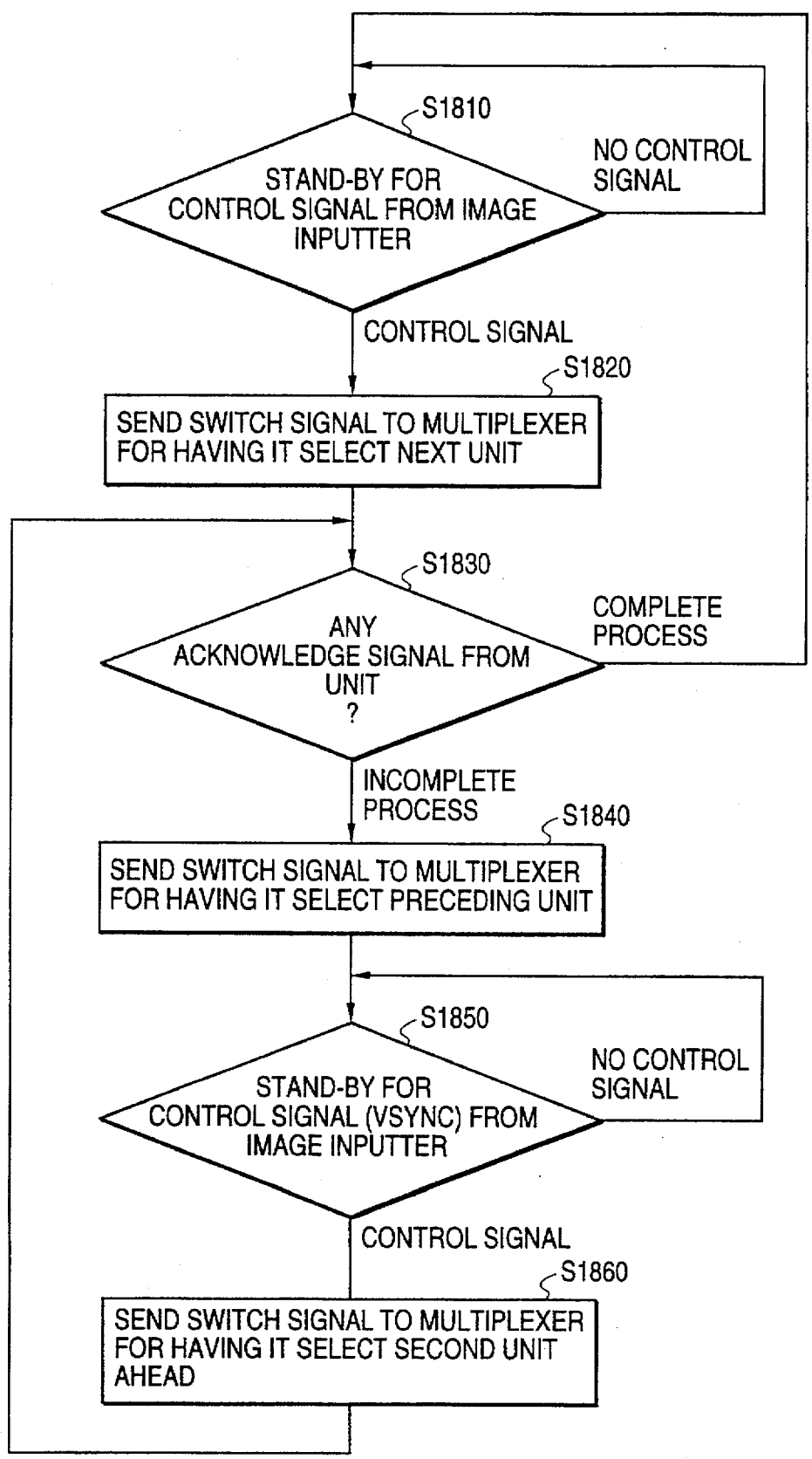
FIG. 18C is a control flowchart for the operation of the arbitrator in the first case without a wait for an incomplete unit.

FIG. 18C is a control flowchart for the operation of the arbitrator in the first case without a wait for an incomplete unit.

S1810: The arbitrator 1722 stands by for a control signal from the image inputter 1710.

S1820: On receiving a control signal, the arbitrator 1722 emits a switch signal to the multiplexer 1716 for having the multiplexer 1716 select the next unit.

S1830: If the acknowledge signal from the unit indicates a process completion, the arbitrator 1722 reverts to step S1810 and stands by for the next control signal. If the acknowledge signal from the unit does not indicate a process completion, the arbitrator 1722 proceeds to step S1840.

S1840: The arbitrator 1722 emits a switch signal to the multiplexer 1716 for having the multiplexer 1716 select the preceding unit.

S1850: The arbitrator 1722 waits for a control signal from the image inputter 1710.

S1860: On receiving a control signal, the arbitrator 1722 emits a switch signal to the multiplexer 1716 for having the multiplexer 1716 select a second unit ahead. Then, the arbitrator 1722 reverts to step S1830.

FIG. 18B is a timing chart for the operation of the arbitrator in the first case without a wait for an incomplete unit.

More specifically, FIG. 18B shows the timings of arbitrating functions, when the arbitrator 1722 follows the flow of steps illustrated in FIG. 18C.

That is, when processor element i+1 has not completed its process, its acknowledge signal is NG, and a register clock becomes ineffective. As a result, a counter value becomes i+1, but a register output is fixed at i, and the processor element selection number i+2, which indicates a second processor element ahead is outputted at the next timing of the control signal.

Figure 19A:
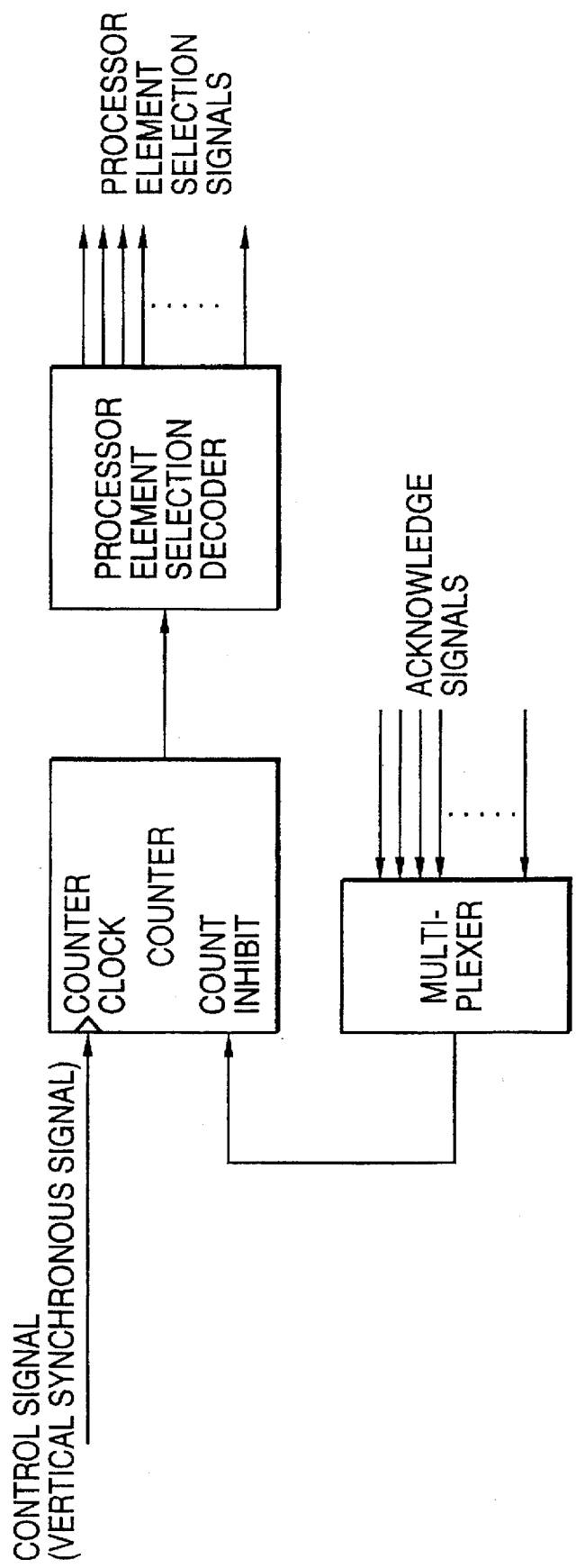
FIG. 19A is a block diagram of the arbitrator for an operation in a second case with a wait for an incomplete unit.

FIG. 19A is a block diagram of an arbitrator for an operation in a second case with a wait for an incomplete unit.

As with the description of FIG. 18A, a plurality of acknowledge signals and a plurality of processor element selection signals control the arbitrator 1722 and the plurality of processor elements 1714 (1714A, 1714B, . . . , 1714X) in the respective image processing units. Each of the plurality of acknowledge signals notifies the arbitrator 1722 of the completion of the process by the corresponding one of the plurality of processor elements 1714 (1714A, 1714B, . . . , 1714X). The arbitrator 1722 can read only the acknowledge signal from the unit currently being selected. Each of the plurality of processor element selection signals notifies of the corresponding one of plurality of the processor elements 1714 (1714A, 1714B, . . . , 1714X) of whether or not the multiplexer 1716 select it. Thus, the plurality of processor elements 1714 (1714A, 1714B, . . . , 1714X) can come to know whether or not the home units are being selected.

Figure 19C:
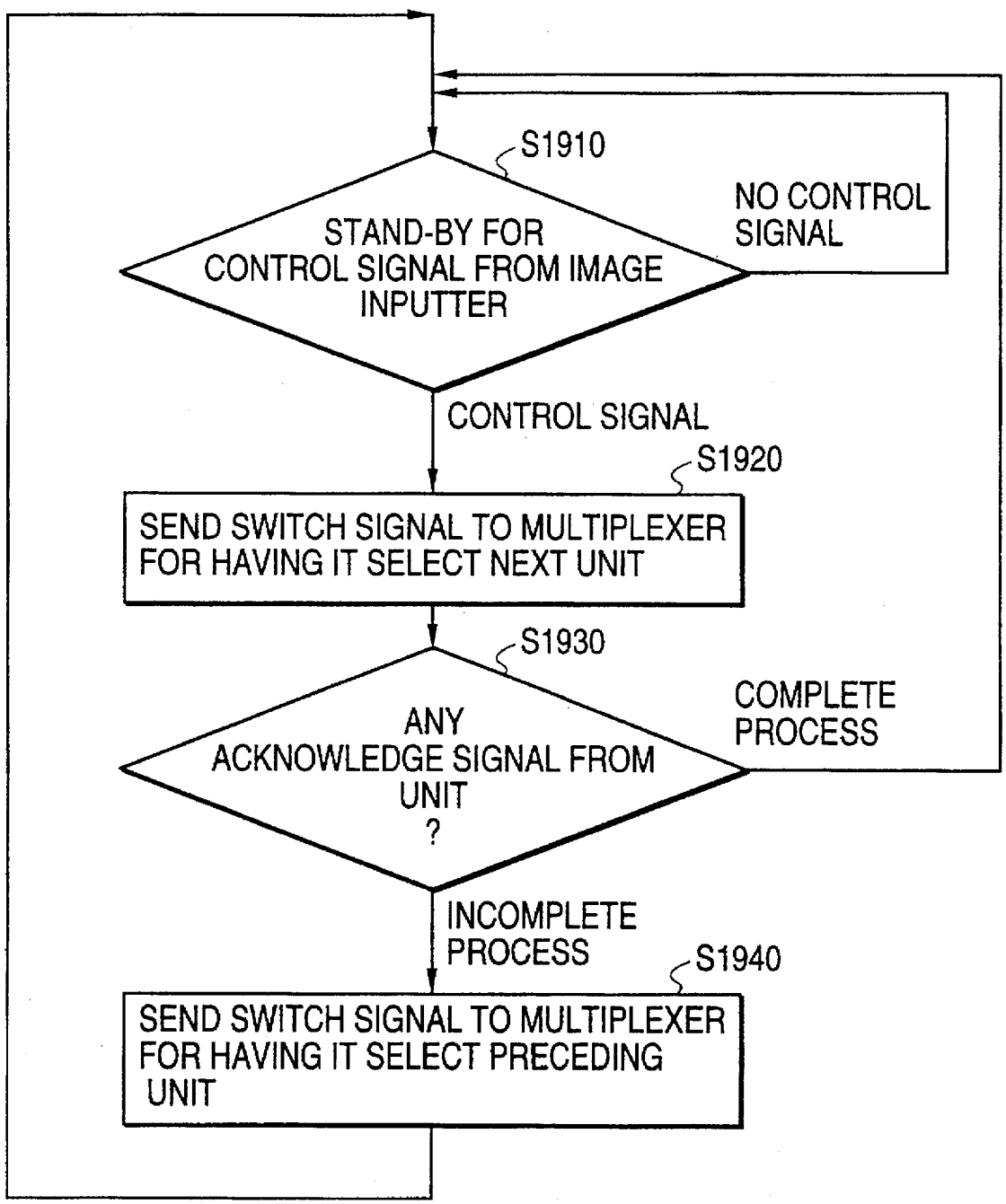
FIG. 19C is a control flowchart for the operation of the arbitrator in the second case with a wait for an incomplete unit.

FIG. 19C is a control flowchart for the operation of the arbitrator in the second case with a wait for an incomplete unit.

S1910: The arbitrator 1722 stands by for a control signal from the image inputter 1710.

S1920: On receiving a control signal, the arbitrator 1722 emits a switch signal to the multiplexer 1716 for having the multiplexer 1716 select the next unit.

S1930: If the acknowledge signal from the unit indicates a process completion, the arbitrator 1722 reverts to step S1910 and stands by for the next control signal. If the acknowledge signal from the unit does not indicate a process completion, the arbitrator 1722 proceeds to step S1940.

S1940: The arbitrator 1722 emits a switch signal to the multiplexer 1716 for having the multiplexer 1716 select the preceding unit. The arbitrator 1722 waits for a control signal from the image inputter 1710. Then, the arbitrator 1722 reverts to step S1910.

FIG. 19B is a timing chart for the operation of the arbitrator in the second case with a wait for an incomplete unit.

More specifically, FIG. 19B shows the timings of arbitrating functions, when the arbitrator 1722 follows the flow of steps illustrated in FIG. 19C.

That is, when processor element i+1 has not completed its process, its acknowledge signal is NG, and a counter receives a count inhibit signal. As a result, a counter clock is inhibited and a counter value i is retained.

Figure 20B:
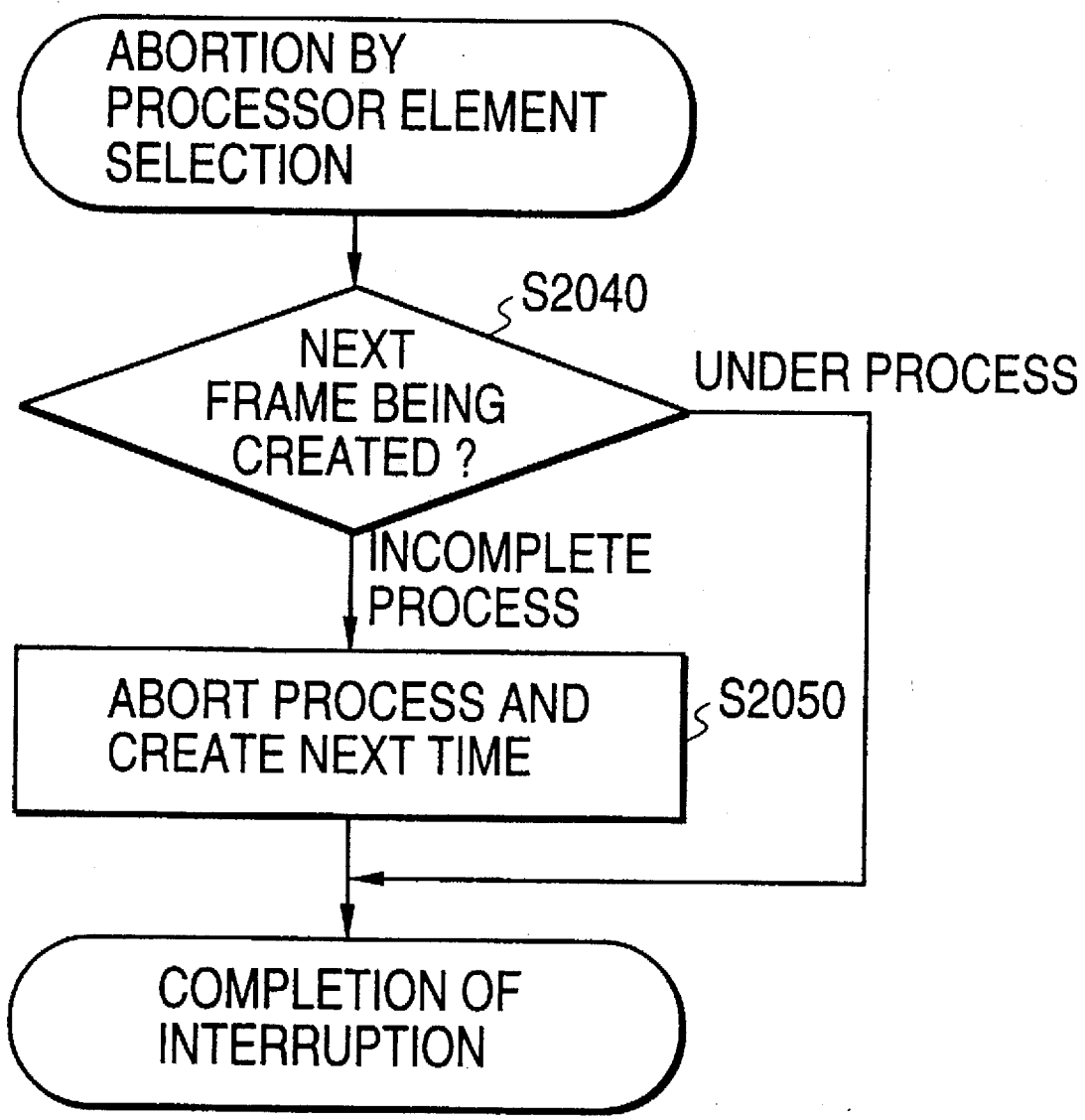

FIGS. 20A and 20B are control flowcharts for a processor element.

More specifically, FIGS. 20A and 20B show the flow of operations by each of the plurality of processor elements 1714 (1714A, 1714B, . . . , 1714X).

S2000: Each of the plurality of processor elements 1714 (1714A, 1714B, . . . , 1714X) stands by for a completion of its processor element selection signal.

S2010: On receiving a completion of its processor element selection signal, each of the plurality of processor elements 1714 (1714A, 1714B, . . . , 1714X) sets its acknowledge signal to "incomplete".

S2020: Each of the plurality of processor elements 1714 (1714A, 1714B, . . . , 1714X) creates the next frame.

S2030: Then, after the process is complete, each of the plurality of processor elements 1714 (1714A, 1714B, . . . , 1714X) sets its acknowledge signal to "complete".

Each of the plurality of processor elements 1714 (1714A, 1714B, . . . , 1714X) parallelly perform processes in steps S2000 through S2030 shown in FIG. 20A. No timing adjustments are required among the units, whose operations are dependent solely on the plurality of processor element selection signals.

The first case without a wait for an incomplete unit (illustrated in FIGS. 18A, 18B and 18C) further requires steps S2040 and S2050 shown in FIG. 20B.

That is, a processor element selection signal interrupts the process of the corresponding one of the plurality of processor elements 1714 (1714A, 1714B, . . . , 1714X).

S2040: Each of the plurality of processor elements 1714 (1714A, 1714B, ..., 1714X) judges whether or not the next frame is being created or already processed. If it is being processed, each of the plurality of processor elements 1714 (1714A, 1714B, ..., 1714X) proceeds to S2050. If it is already processed, each of the plurality of processor elements 1714 (1714A, 1714B, ..., 1714X) gets out of an interruption.

S2050: Each of the plurality of processor elements 1714 (1714A, 1714B, ..., 1714X) aborts its process and creates the next frame. Then, each of the plurality of processor elements 1714 (1714A, 1714B, ..., 1714X) gets out of an interruption.

Figure 21A:
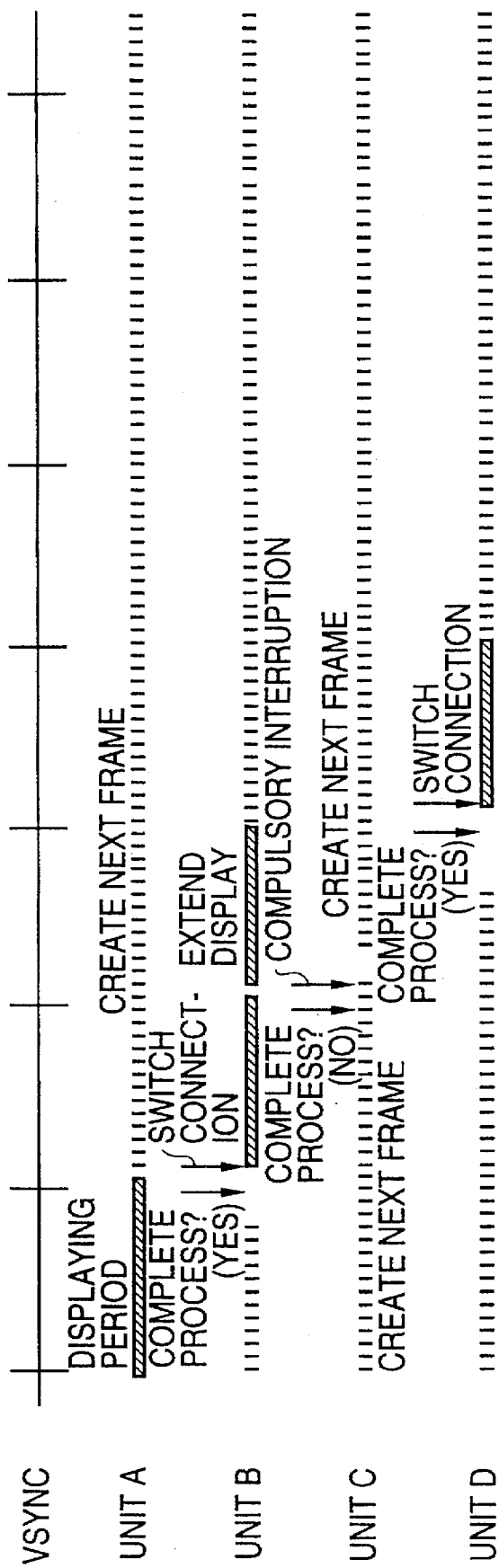
FIG. 21A is a timing chart showing operations of the third preferred embodiment of this invention in the first case without a wait for an incomplete unit shown in FIGS. 18A, 18B and 18C.

FIG. 21A is a timing chart showing operations of the third preferred embodiment of this invention in the first case without a wait for an incomplete unit shown in FIGS. 18A, 18B and 18C.

Four [4] units A, B, C and D perform their processes. A dot line indicates a processing period for creating a next frame, and a solid line indicates a displaying period.

After a displaying period for unit A is over, the arbitrator 1722 judges whether or not the next unit B has completed its processes. Because it has already completed them, a unit connection is switched, and unit B performs its display. After the displaying period for unit B is over, the arbitrator 1722 judges whether or not the next unit C has completed its processes. Because it has not completed them yet, the processes of unit C are compulsorily aborted in the third preferred embodiment of this invention in the first case without a wait for an incomplete unit. The next frame creation is initiated, and the displaying period of unit B is extended for its continued display. When the extended displaying period of unit B expires, the arbitrator 1722 judges whether the second succeeding unit D has completed its processes. Because it has already completed them, a unit connection is switched for having unit D perform a display.

As such, according to the third preferred embodiment in the first case without a wait for an incomplete unit, an incomplete unit skips to process the next frame without a wait for its process completion, and the preceding unit B continues displaying its image.

Figure 21B:
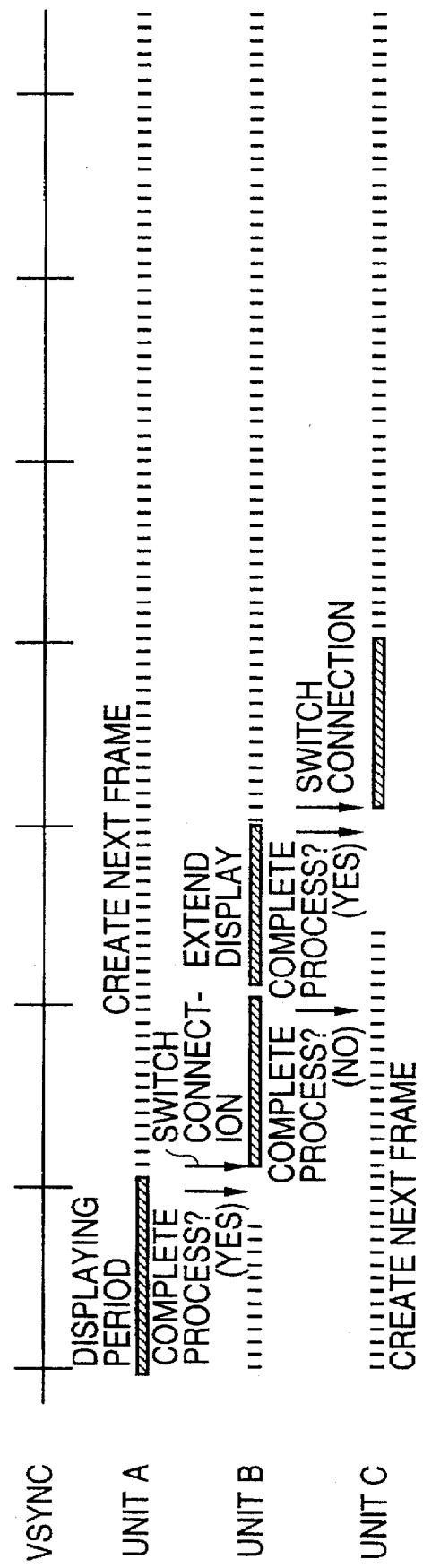
FIG. 21B is a timing chart showing operations of the third preferred embodiment of this invention in the second case with a wait for an incomplete unit shown in FIGS. 19A, 19B and 19C.

FIG. 21B is a timing chart showing operations of the third preferred embodiment of this invention in the second case with a wait for an incomplete unit shown in FIGS. 19A, 19B and 19C.

Three [3] units A, B and C perform their processes. Again, a dot line indicates a processing period for creating a next frame, and a solid line indicates a displaying period.

After a displaying period for unit A is over, the arbitrator 1722 judges whether or not the next unit B has completed its processes. Because it has already completed them, a unit connection is switched, and unit B performs its display. After the displaying period for unit B is over, the arbitrator 1722 judges whether or not the next unit C has completed its processes. Because it has not completed them yet, in the third preferred embodiment of this invention in the second case with a wait for an incomplete unit, the displaying period of unit B is extended for its continued display. When the extended displaying period of unit B expires, the arbitrator 1722 again judges whether the next unit C has completed its processes. If it has already completed them, a unit connection is switched for having unit C perform a display.

As such, according to the third preferred embodiment in the second case with a wait for an incomplete unit, an incomplete unit continues its processes "as is", and the preceding unit B continues displaying its image.

FIG. 22 is a block diagram of a system based on a combination of the arbitrator 1722 and another multiplexer 1400 using the bus system.

The multiplexer 1400 comprises a controller 1410, an input picture element register 1420, a DMA controller 1430, an output picture element register 1440, a bus controller 1450 and a bus 1460. During a division and an integration of an image, the multiplexer 1400 connects each of the plurality of semiconductor memories 1712 (1712A, 1712B, ..., 1712X) to the bus 1460 and sets an address to each of the plurality of semiconductor memories 1712 (1712A, 1712B, ..., 1712X), and transfers data by a DMA (Direct Memory Access) transfer over an address bus and a data bus.

The input picture element register 1420 stores the image data inputted from the image inputter 1710 in picture elements whose values the DMA controller 1430 reads and writes into any of the plurality of semiconductor memories 1712 (1712A, 1712B, ..., 1712X) through the bus controller 1450. The DMA controller 1430 also reads image data from any of the plurality of semiconductor memories 1712 (1712A, 1712B, ..., 1712X) through the bus controller 1450 and writs them into the output picture element register 1440. The image outputter 1718 outputs the memory content of the output picture element register 1440 e.g. according to an NTSC output cycle.

A Fourth Preferred Embodiment

Figure 23:
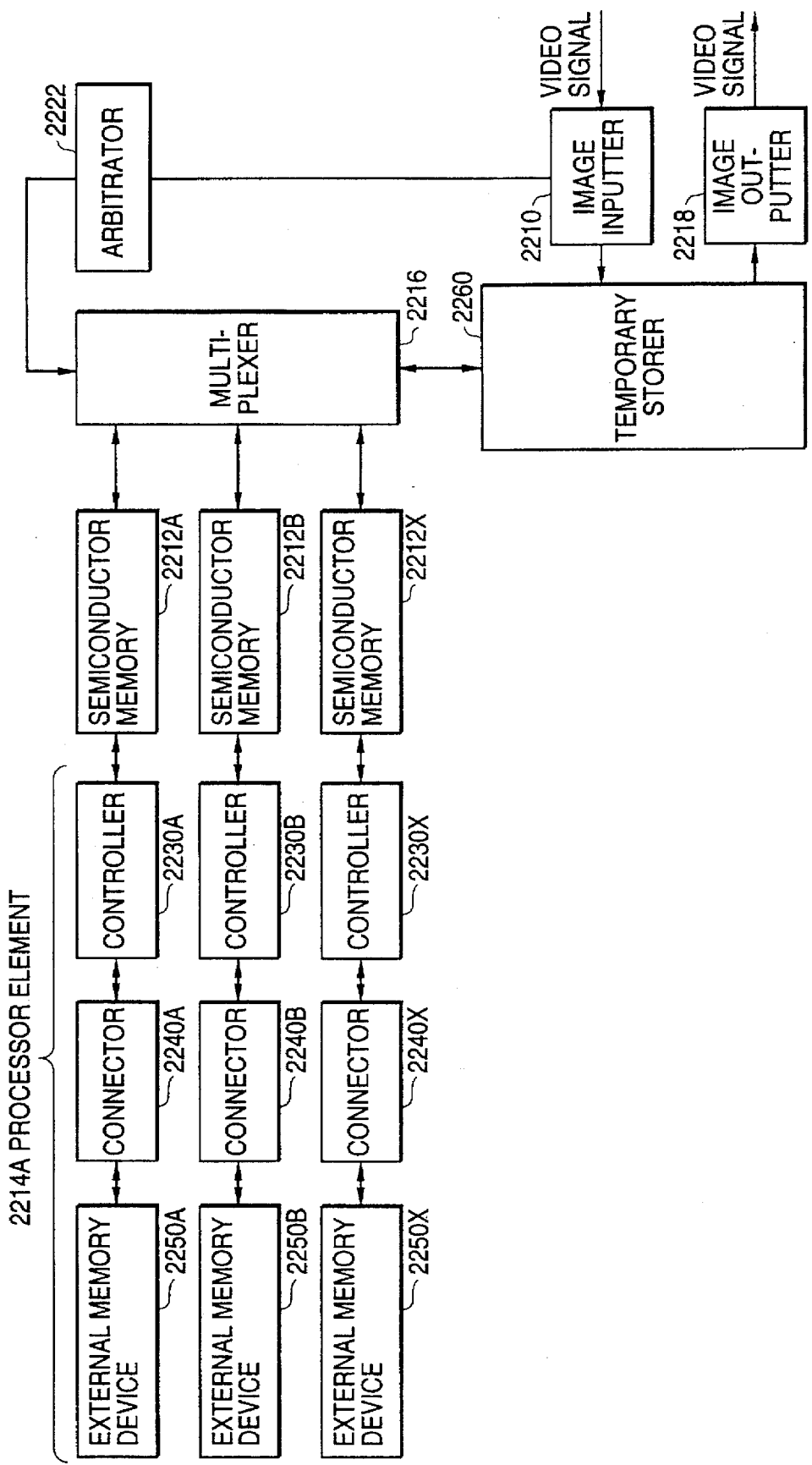
FIG. 23 is a block diagram of a fourth preferred embodiment of this invention.

FIG. 23 is a block diagram of a fourth preferred embodiment of this invention.

A configuration of the fourth preferred embodiment further provides a temporary storer 2260 between a multiplexer 2216 and an image inputter 2210 as well as an image outputter 2218.

In the third embodiment, when a unit has not yet completed its processes, the preceding unit displays a substitute picture. This causes a problem that the preceding unit cannot continue its processes.

To overcome this problem, the fourth preferred embodiment causes the newly provided temporary storer 2260 to store a displayed picture. When a unit has not yet completed its process, the preceding picture stored in the temporary storer 2260 is re-outputted to the image inputter 2218. This enables the preceding unit to continue its processes, even when a next unit has not yet completed its processes.

Figure 24:
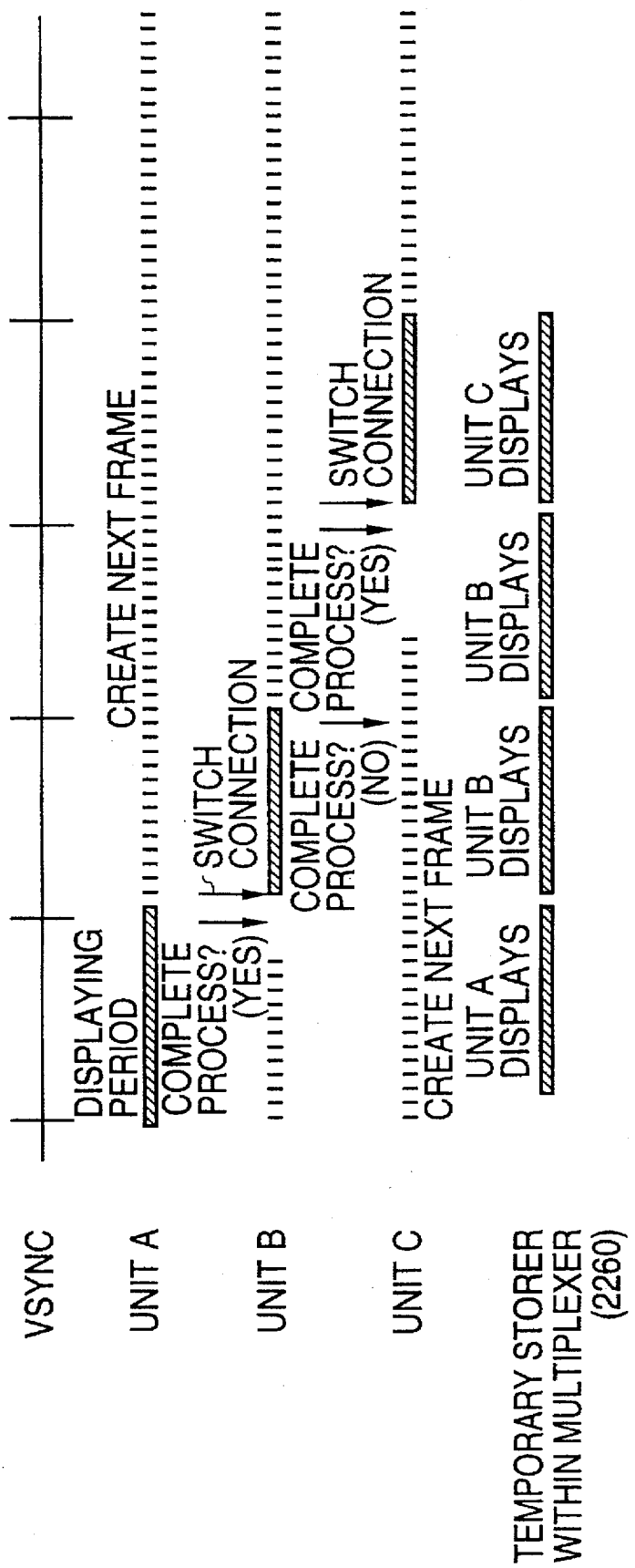
FIG. 24 is a timing chart showing an operation of the fourth preferred embodiment of this invention.

FIG. 24 is a timing chart showing an operation of the fourth preferred embodiment of this invention.

Three [3] units A, B and C perform their processes. Again, a dot line indicates a processing period for creating a next frame, and a solid line indicates a displaying period.

After a displaying period for unit A is over, an arbitrator 2222 judges whether or not the next unit B has completed its processes. Because it has already completed them, a unit connection is switched, and unit B performs its display. This has been exactly the Same as the operation in the third preferred embodiment.

After the displaying period for unit B is over, the arbitrator 2222 judges whether or not the next unit C has completed its processes. Because it has not completed them yet, in the fourth preferred embodiment of this invention, the displayed frame of unit B stored in the temporary storer 2260 is outputted to the image outputter 2218 for its continued display, while unit B starts its processes for the next frame and unit C continues its incomplete processes for creating a frame. When the temporary storer 2260 ends outputting frame data, the arbitrator 2222 again judges whether next unit C has completed its processes. If it has already completed them, a unit connection is switched for having unit C perform a display.

As such, according to the fourth preferred embodiment, the preceding unit B continues its processes, while an incomplete unit also continues its processes "as is".

A Fifth Preferred Embodiment

Figure 25:
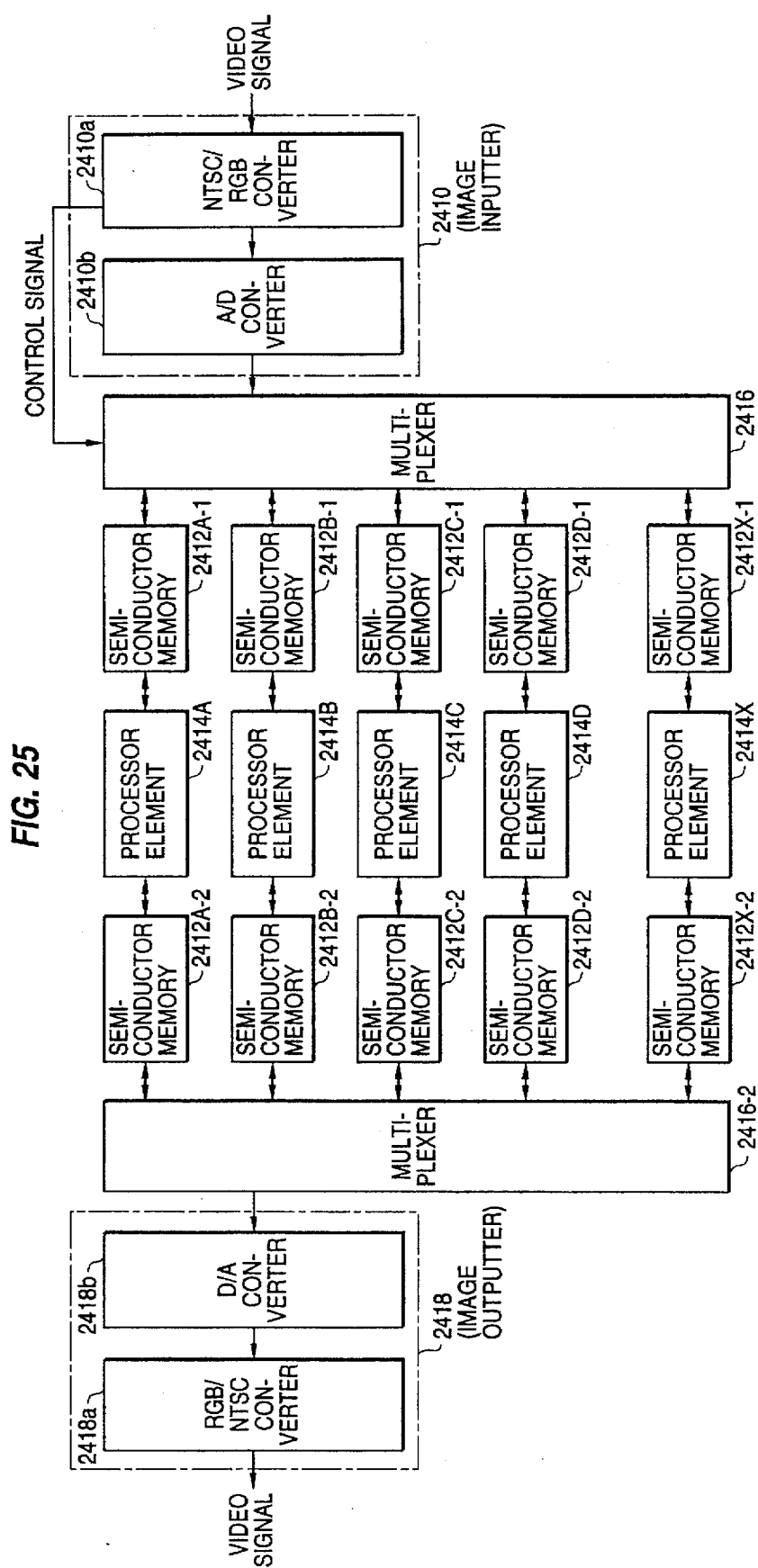
FIG. 25 is a block diagram of a fifth preferred embodiment of this invention.

FIG. 25 is a block diagram of a fifth preferred embodiment of this invention.

In the fifth preferred embodiment of this invention, a multiplexer 2416-1 is provided for an image inputter 2410 and a multiplexer 2416-2 is provided for an image outputter 2418. Multiplexer 2416-1 on the input side connects with a plurality of semiconductor memories 2412-2 (2412A-1, 2412B-1, . . . , 2412X-1) for storing image data received as an image input. The plurality of semiconductor memories 2412-2 (2412A-1, 2412B-1, . . . , 2412X-1) in turn connect with a plurality of processor elements 2414 (2414A, 2414B, . . . , 2414X). Another plurality of semiconductor memories 2412-2 (2412A-1, 2412B-1, . . . , 2412X-1) for storing image data supplied as an image output are connected between the plurality of processor elements 2414 (2414A, 2414B, . . . , 2414X) and multiplexer 2416-2 on the output side.

The fifth preferred embodiment enables an inputted frame to be outputted while they are processed.

A Sixth Preferred Embodiment

Figure 26:
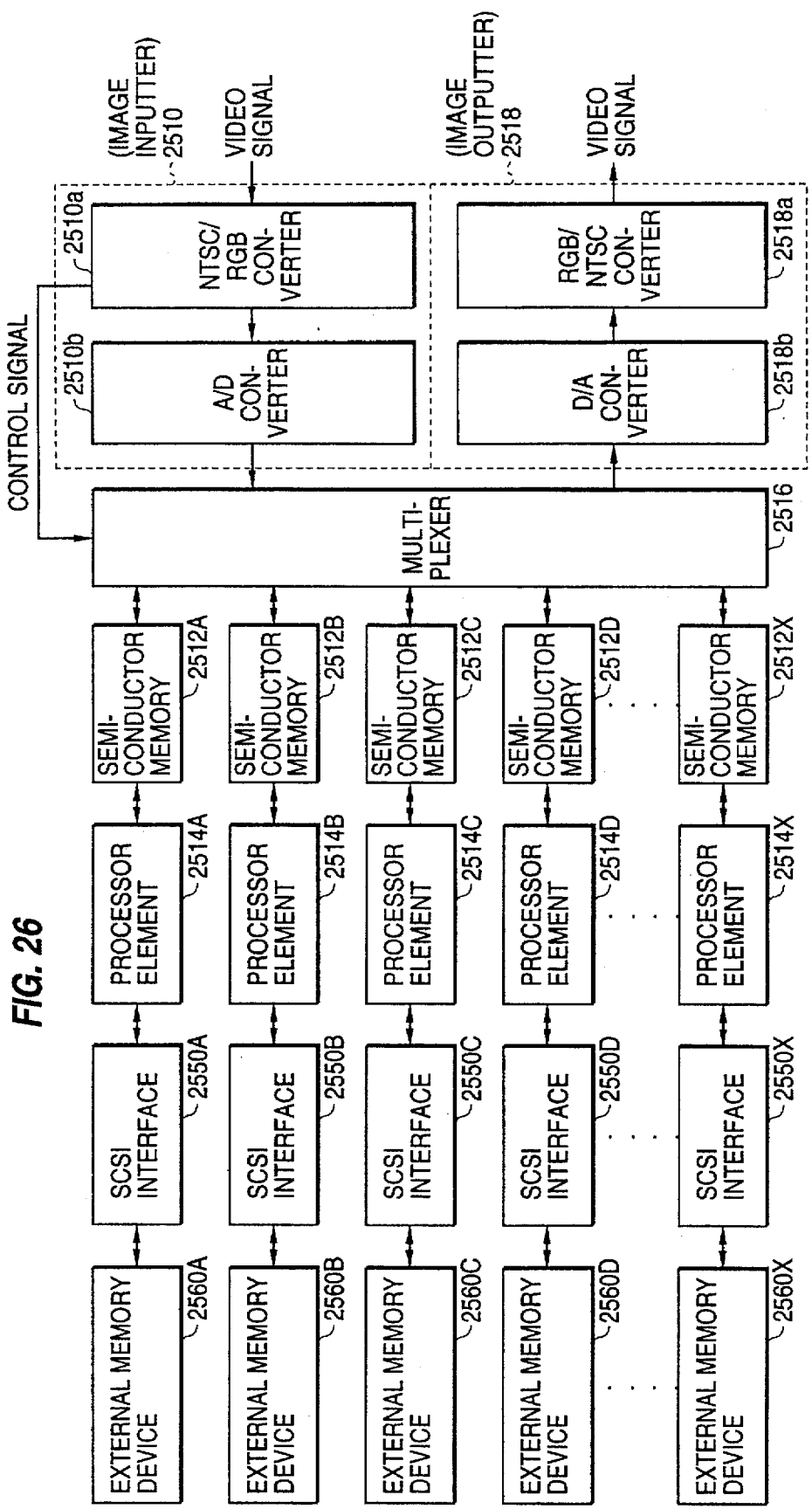
FIG. 26 is a block diagram of a sixth preferred embodiment of this invention.

FIG. 26 is a block diagram of a sixth preferred embodiment of this invention.

A configuration of the sixth preferred embodiment further includes a plurality of external memory devices 2560 (2560A, 2560B, . . . , 2560X) respectively connected via a plurality of SCSI interfaces 2550 (2550A, 2550B, . . . , 2550X) in addition to the configuration of the first preferred embodiment.

The sixth embodiment of this invention enables such processes as writing "as is" image data read by a plurality of processor elements 2514 (2514A, 2514B, . . . , 2514X) respectively from the plurality of external memory devices 2560 (2560A, 2560B, . . . , 2560X) respectively to the plurality of semiconductor memories 2512 (2512A, 2512B, . . . , 2512X), writing processed image data obtained by accessing the plurality of external memory devices 2560 (2560A, 2560B, . . . , 2560X) for the plurality of semiconductor memories 2512 (2512A, 2512B, . . . , 2512X) respectively to the plurality of semiconductor memories 2512 (2512A, 2512B, . . . , 2512X), and writing image data supplied to the plurality of semiconductor memories 2512 (2512A, 2512B, . . . , 2512X) respectively to the plurality of external memory devices 2560 (2560A, 2560B, . . . , 2560X).

A Seventh Preferred Embodiment

Figure 27:
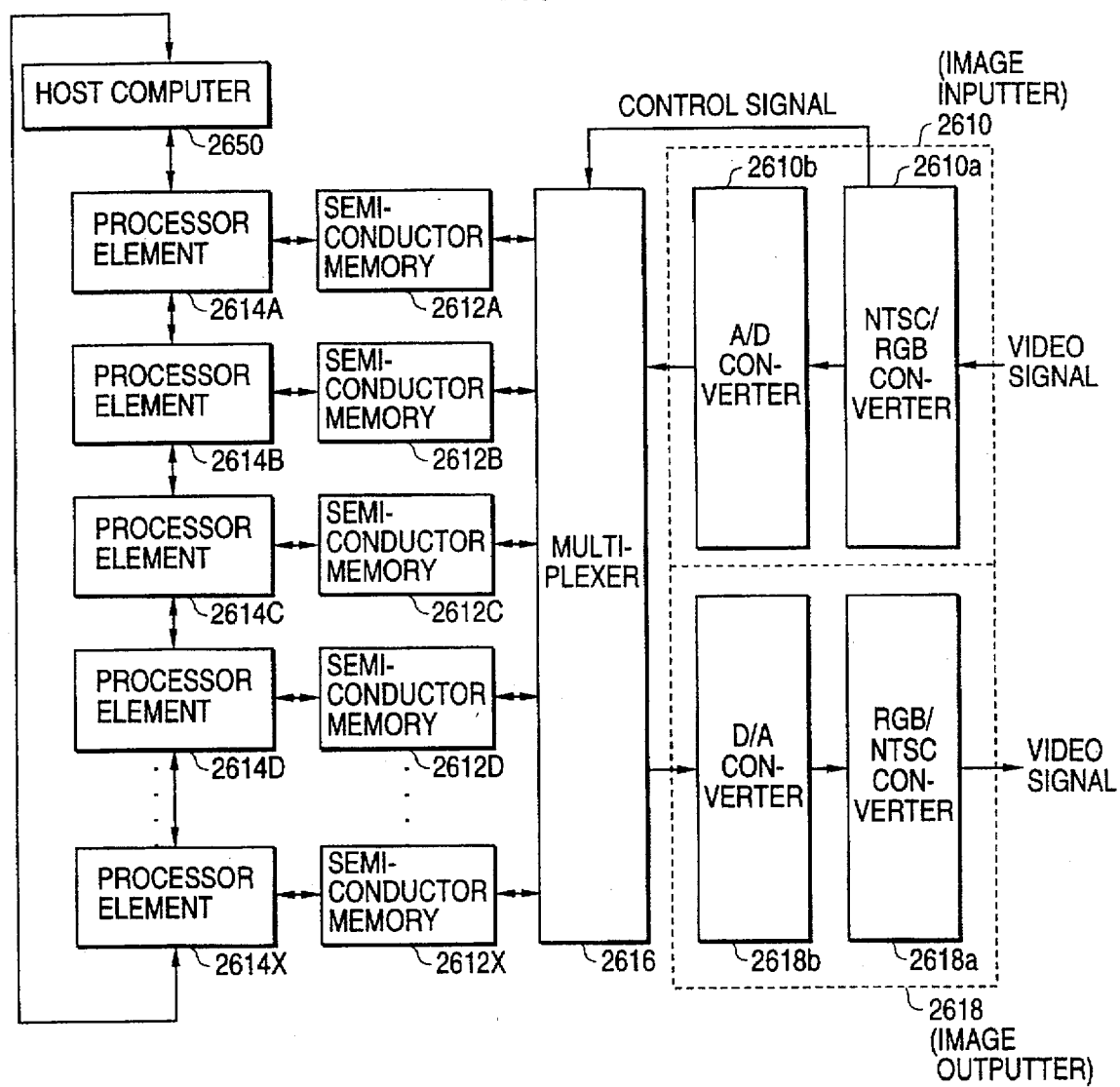
FIG. 27 is a block diagram of a seventh preferred embodiment of this invention.

FIG. 27 is a block diagram of a seventh preferred embodiment of this invention.

A configuration of the seventh preferred embodiment further includes a host computer 2650 anew in addition to the configuration of the first preferred embodiment. The host computer 2650 and a plurality of processor elements 2614 (2614A, 2614B, . . . , 2614X) form a loop connection.

The seventh preferred embodiment enables communications among the plurality of processor elements 2614 (2614A, 2614B, . . . , 2614X) to be routed easily, thereby enabling the processing results respectively by the plurality of processor elements 2614 (2614A, 2614B, . . . , 2614X) to be readily transferred to the host computer 2650 and the plurality of processor elements 2614 (2614A, 2614B, . . . , 2614X) to make processing requests effortlessly to the host computer 2650. Also, the loop connection allows jobs to be transferred in packets, thereby having the plurality of processor elements 2614 (2614A, 2614B, . . . , 2614X) having lighter workloads to process the jobs.

What is claimed is:

1. A moving image processing system, comprising:

image inputter means for receiving a video signal, for converting said video signal into a digital signal and for generating a control signal which is synchronized with a frame of said video signal;

a plurality of temporary storer means for temporarily storing said digital signal in frame units of said video signal;

a plurality of processor element means, each respectively connected to said plurality of temporary storer means in a one-to-one correspondence, each for respectively processing said digital signals stored in said plurality of temporary storer means, said plurality of temporary storer means for further storing digital data processed by said plurality of processor element means, respectively;

multiplexer means, connected to said plurality of temporary storer means and to said image inputter means, for receiving said control signal from said image inputter means, for selecting at least one of said plurality of temporary storer means based on said control signal, for transmitting said digital signal to said at least one of said plurality of temporary storer means in frame units of said video signal, based on said control signal, and for receiving said digital signal from said at least one of said plurality of temporary storer means based on said control signal;

image outputter means, connected to said multiplexer means, for converting said digital signal into a video signal; said one of said plurality of temporary storer means and a corresponding one of said plurality of processor element means forming a processing unit of the digital signal in frame units and a number of processing units being adjusted to a required processing power of the system.

2. The moving image processing system according to claim 1 wherein said multiplexer means comprises means for receiving and transmitting a sequential digital signal;

said inputter means comprises means for converting a video signal into a sequential digital signal and for generating a control signal which is synchronized with a frame of the video signal;

said outputter means comprises means for converting a sequential digital signal into a video signal; and said temporary storer means comprises means for receiving a sequential digital signal from a multiplexer means in frame units of said video signal and for transmitting a sequential digital signal to a multiplexer means.

3. The moving image processing system according to claim 1 further comprising a regeneration range list means, connected to said multiplexer means and said temporary storer means, for designating a list of frame-numbers to be regenerated so that said frames are sequentially and randomly regenerated.

4. The moving image processing system according to claim 1 wherein said multiplexer means includes means for temporarily storing said image data which is to be transmitted to the image outputter means and to be received from the image inputter means.

5. The moving image processing system according to claim 1 further comprising a large capacity storer means, coupled to said temporary storer means, for writing and reading the image data into and from, respectively, the temporary storer means, under the control of said processor element means.

6. A moving image processing system, comprising:

image inputter means for receiving a video signal, for converting said video signal into a digital signal and for generating a control signal which is synchronized with a frame of said video signal;

a plurality of temporary storer means for temporarily storing said digital signal;

a plurality of processor element means, each respectively connected to said plurality of temporary storer means in a one-to-one correspondence, each for respectively processing said digital signals stored in said plurality of temporary storer means, said plurality of temporary storer means for further storing digital data processed by said plurality of processor element means, respectively;

multiplexer means, connected to said plurality of temporary storer means and to said image inputter means, for receiving said control signal from said image inputter means, for selecting at least one of said plurality of temporary storer means based on a switching signal, for transmitting said digital signal to said at least one of said plurality of temporary storer means based on said control signal, and for receiving said digital signal from said at least one of said plurality of temporary storer means based on said control signal;

switch signal generator means, connected to said image inputter means and to said multiplexer means, for generating said switching signal and for controlling said multiplexer means in correspondence with said control signal generated by said image inputter means;

image outputter means, connected to said multiplexer means, for converting said digital signal into a video signal; and one of said plurality of temporary storer means and a corresponding one of said plurality of processor element means forming a processing unit of the digital signal in frame units and a number of processing units being adjusted to a required processing power of the system.

7. The moving image processing system according to claim 6 wherein said multiplexer means comprises means for receiving and transmitting a sequential digital signal;

said inputter means comprises means for converting a video signal into a sequential digital signal and for generating a control signal which is synchronized with a frame of the video signal;

said outputter means comprises means for converting a sequential digital signal into a video signal; and said temporary storer means comprises means for receiving a sequential digital signal from a multiplexer means and for transmitting a sequential digital signal to a multiplexer means.

8. The moving image processing system according to claim 6 further comprising a regeneration range list means, connected to said multiplexer means and said temporary storer means, for designating a list of frame-numbers to be regenerated so that said frames are sequentially and randomly regenerated.

9. The moving image processing system according to claim 6 wherein said multiplexer means includes means for temporarily storing said image data which is to be transmitted to the image outputter means and to be received from the image inputter means.

10. The moving image processing system according to claim 6 further comprising a large capacity storer means, coupled to said temporary storer means, for writing and reading the image data into and from, respectively, the temporary storer means, under the control of said processor element means.

11. A moving image processing system, comprising:

image inputter means for receiving a video signal, for converting said video signal into a digital signal and for generating a control signal which is synchronized with a frame of said video signal;

a plurality of temporary storer means for temporarily storing said digital signal in frame units of said video signal;

a plurality of processor element means, each respectively connected to said plurality of temporary storer means in a one-to-one correspondence, each for respectively processing said digital signals stored in said plurality of temporary storer means, said plurality of temporary storer means for further storing digital data processed by said plurality of processor element means, respectively;

multiplexer means, connected to said plurality of temporary storer means and to said image inputter means, for receiving said control signal from said image inputter means, for selecting at least one of said plurality of temporary storer means based on said control signal, for transmitting said digital signal to said at least one of said plurality of temporary storer means in frame units of said video signal, based on said control signal, and for receiving said digital signal from said at least one of said plurality of temporary storer means based on said control signal;

image outputter means, connected to said multiplexer means, for converting said digital signal into a video signal;

arbitrator means, connected to said image inputter means and to said multiplexer means, for checking whether said plurality of processor element means complete their processes and for controlling said multiplexer means to select one of said plurality of temporary storer means; and one of said plurality of temporary storer means and a corresponding one of said plurality of processor elements means forming a processing unit of the digital signal in frame units and a number of processing units being adjusted to a required processing power of the system.

12. The moving image processing system according to claim 11 wherein said multiplexer means comprises means for receiving and transmitting a sequential digital image signal;

said inputter means comprises means for converting a video signal into a sequential digital signal and for generating a control signal which is synchronized with a frame of the video signal;

said outputter means comprises means for converting a sequential digital signal into a video signal; and said temporary storer means comprises means for receiving a sequential digital signal from a multiplexer means in frame units of said video signal and for transmitting a sequential digital signal to a multiplexer means.

13. The moving image processing system according to claim 11 further comprising a regeneration range list means, connected to said multiplexer means and said temporary storer means, for designating a list of frame-numbers to be regenerated so that said frames are sequentially and randomly regenerated.

14. The moving image processing system according to claim 11 wherein said multiplexer means includes means for temporarily storing said image data which is to be transmitted to the image outputter means and to be received from the image inputter means.

15. The moving image processing system according to claim 11 further comprising a large capacity storer means, coupled to said temporary storer means, for writing and reading the image data into and from, respectively, the temporary storer means, under the control of said processor element means.

* * * * *